(12) United States Patent
Kwak et al.

(10) Patent No.: US 11,150,668 B2
(45) Date of Patent: Oct. 19, 2021

(54) PLURALITY OF ROBOT CLEANER AND A CONTROLLING METHOD FOR THE SAME

(71) Applicant: LG Electronics Inc., Seoul (KR)

(72) Inventors: Donghoon Kwak, Seoul (KR); Jaehwan Ko, Seoul (KR); Hyukdo Kweon, Seoul (KR)

(73) Assignee: LG Electronics Inc., Seoul (KR)

(*) Notice: Subject to any disclaimer, the term of this patent is extended or adjusted under 35 U.S.C. 154(b) by 239 days.

(21) Appl. No.: 16/401,232

(22) Filed: May 2, 2019

(65) Prior Publication Data
US 2019/0339711 A1    Nov. 7, 2019

(30) Foreign Application Priority Data

May 4, 2018 (KR) .......................... 10-2018-0051964
Feb. 1, 2019 (KR) .......................... 10-2019-0014051

(51) Int. Cl.
*B25J 11/00* (2006.01)
*B25J 9/16* (2006.01)
*G05D 1/02* (2020.01)

(52) U.S. Cl.
CPC .......... *G05D 1/0287* (2013.01); *B25J 9/1666* (2013.01); *B25J 9/1694* (2013.01);
(Continued)

(58) Field of Classification Search
CPC .. G05D 1/0287; G05D 1/0289; G05D 1/0212; G05D 2201/0203; G05D 1/028;
(Continued)

(56) References Cited

U.S. PATENT DOCUMENTS

| 9,637,310 B1* | 5/2017 | Zou | B65G 43/10 |
| 10,037,029 B1* | 7/2018 | Russell | B60W 30/00 |

(Continued)

FOREIGN PATENT DOCUMENTS

| CN | 1834839 A | 9/2006 |
| CN | 101554302 A | 10/2009 |

(Continued)

OTHER PUBLICATIONS

Taiwanese Office Action received for Taiwanese Application No. 108115286, dated May 25, 2020 (37 pages).
(Continued)

*Primary Examiner* — Abby Y Lin
*Assistant Examiner* — Esvinder Singh
(74) *Attorney, Agent, or Firm* — Finnegan, Henderson, Farabow, Garrett & Dunner LLP

(57) ABSTRACT

A mobile robot according to an embodiment of the present disclosure may include a traveling unit configured to move a main body; a memory configured to store trajectory information of a moving path corresponding to the movement of the main body; a communication unit configured to communicate with another mobile robot that emits a signal; and a controller configured to recognize the location of the another mobile robot based on the signal, and control the another mobile robot to follow a moving path corresponding to the stored trajectory information based on the recognized location. In addition, the controller may control the moving of the another mobile robot to remove at least part of the stored trajectory information, and allow the another mobile robot to follow a moving path corresponding to the remaining trajectory information in response to whether the moving path corresponding to next trajectory information to be followed by the another mobile robot satisfies a specified condition.

18 Claims, 28 Drawing Sheets

(52) U.S. Cl.
CPC ........ *B25J 11/0085* (2013.01); *G05D 1/0212* (2013.01); *G05D 1/0289* (2013.01); *G05D 2201/0203* (2013.01)

(58) Field of Classification Search
CPC .............. G05D 1/0293; G05D 1/0088; G05D 2201/0215; G05D 1/0295; G05D 1/0027; G05D 1/0214; G05D 1/0221; G05D 1/0223; B25J 11/0085; B25J 9/1694; B25J 9/1666; B25J 9/1664; B25J 9/0003; A47L 11/00; A47L 11/10; A47L 11/20; A47L 11/28; A47L 11/24; A47L 11/4061; A47L 2201/04; A47L 2201/06
See application file for complete search history.

(56) References Cited

U.S. PATENT DOCUMENTS

| | | | | |
|---|---|---|---|---|
| 10,156,850 | B1* | 12/2018 | Ansari | B60W 30/095 |
| 10,303,170 | B2* | 5/2019 | Brunet | G05D 1/104 |
| 10,394,249 | B2* | 8/2019 | Kim | A47L 9/2842 |
| 10,894,322 | B2* | 1/2021 | Komlosi | B25J 9/1666 |
| 10,906,179 | B2* | 2/2021 | Nguyen | B25J 5/007 |
| 2008/0082210 | A1 | 4/2008 | Kim et al. | |
| 2009/0062974 | A1 | 3/2009 | Tamamoto et al. | |
| 2013/0090802 | A1* | 4/2013 | Curtis | G05D 1/024 701/25 |
| 2014/0121833 | A1 | 5/2014 | Lee et al. | |
| 2014/0172223 | A1* | 6/2014 | Murphy | G05D 1/0289 701/25 |
| 2016/0081520 | A1* | 3/2016 | Ryu | A47L 1/03 134/18 |
| 2016/0235270 | A1* | 8/2016 | Santini | A47L 11/4013 |
| 2018/0073266 | A1* | 3/2018 | Goldenberg | B25J 11/0085 |
| 2018/0192845 | A1* | 7/2018 | Gu | B25J 13/089 |
| 2018/0281191 | A1* | 10/2018 | Sinyavskiy | B25J 11/0085 |
| 2018/0317725 | A1* | 11/2018 | Lee | A47L 9/2826 |
| 2019/0176328 | A1* | 6/2019 | Kichkaylo | B66F 9/063 |
| 2019/0179325 | A1* | 6/2019 | Deng | G01C 21/20 |
| 2019/0212752 | A1* | 7/2019 | Fong | G06K 9/00 |
| 2019/0277643 | A1* | 9/2019 | Szubbocsev | B60W 60/0016 |
| 2019/0310656 | A1* | 10/2019 | Suzuki | G05D 1/02 |
| 2020/0077860 | A1* | 3/2020 | Lamon | G05D 1/0274 |
| 2020/0150655 | A1* | 5/2020 | Artes | G05D 1/0016 |
| 2020/0331148 | A1* | 10/2020 | Zhang | B25J 13/089 |

FOREIGN PATENT DOCUMENTS

| | | |
|---|---|---|
| CN | 101971116 A | 2/2011 |
| CN | 102915465 A | 2/2013 |
| CN | 103076803 A | 5/2013 |
| CN | 104615132 A | 5/2015 |
| CN | 106132187 A | 11/2016 |
| CN | 106853641 A | 6/2017 |
| CN | 106997205 A | 8/2017 |
| CN | 107087435 A | 8/2017 |
| JP | 2007199965 A | 8/2007 |
| JP | 2008191800 A | 8/2008 |
| JP | 2009080804 A | 4/2009 |
| JP | 4351261 B2 | 10/2009 |
| KR | 10-2011-0092158 A | 8/2011 |
| KR | 10-1215395 B1 | 12/2012 |
| KR | 10-1555589 B1 | 9/2015 |
| KR | 10-1649645 B1 | 8/2016 |
| KR | 10-1758736 B1 | 7/2017 |
| TW | 201015455 A | 4/2010 |
| TW | I333178 B | 11/2010 |
| WO | WO 2017036532 A1 | 3/2017 |
| WO | WO 2017/212987 A1 | 12/2017 |

OTHER PUBLICATIONS

International Search Report received from the Korean Intellectual Property Office (KIPO) in PCT/KR2019/005230, dated Aug. 20, 2019.

Notice of Allowance received from the Korean Intellectual Property Office (KIPO) in Korean Patent Application No. KR 10-2019-0014051, dated Oct. 21, 2019.

Notice of Allowance received from the Korean Intellectual Property Office (KIPO) in Korean Patent Application No. 10-2019-0014051, dated Jan. 17, 2020 (3 pages).

Notice of Allowance received in Chinese Application No. 201980045079.0, dated Jul. 13, 2021 (22 pages).

* cited by examiner (a)

(b)

PLURALITY OF ROBOT CLEANER AND A CONTROLLING METHOD FOR THE SAME

CROSS-REFERENCE TO RELATED APPLICATIONS

Pursuant to 35 U.S.C. § 119(a), this application claims the benefit of the earlier filing date and the right of priority to Korean Application Nos. 10-2018-0051964 and 10-2019-0014051, filed on May 4, 2018 and Feb. 1, 2019, respectively, the contents of which is incorporated by reference herein in its entirety.

BACKGROUND OF THE INVENTION

1. Field of the Invention

The present disclosure relates to a plurality of mobile robots that autonomously move while any one thereof follows another one thereof, and a control method thereof.

2. Description of the Conventional Art

Generally, a mobile robot is a device that automatically performs a predetermined operation while moving by itself in a predetermined area without a user's operation. The mobile robot senses obstacles located in the area and performs its operations by moving close to or away from such obstacles.

Such a mobile robot may include a robot cleaner that performs cleaning while moving in an area. The robot cleaner is a cleaner that performs cleaning while moving by itself without user's operation.

In this manner, with the development of such a robot cleaner performing cleaning while moving by itself without a user's operation, there is a need to develop a plurality of robot cleaners for performing cleaning while any one thereof follows another one thereof or while collaborating with each other without a user's operation.

For example, the prior art document WO2017-036532 discloses a method in which a master robot cleaner (hereinafter, referred to as a master robot) controls at least one slave robot cleaner (hereinafter, referred to as a slave robot). The prior art document discloses a configuration in which the master robot detects adjacent obstacles by using an obstacle detection device and determines its position related to the slave robot using position data derived from the obstacle detection device.

In addition, the prior art discloses a configuration in which the master robot and the slave robot perform communication with each other via a server using wireless local area network (WLAN) technology.

According to the prior art document, the master robot can determine the position of the slave robot but the slave robot cannot determine the position of the master robot.

Further, in order for the slave robot to determine (decide) the position of the master robot using the configuration disclosed in the prior art document, the master robot must transmit relative position information regarding the slave robot determined by the master robot to the slave robot through the server.

However, the prior art fails to disclose such a configuration in which the master robot transmits relative position information to the slave robot via the server.

In addition, even if it is assumed that the master robot transmits relative position information, the master robot and the slave robot should perform communication only through the server. Accordingly, such communication with the server may be disconnected when the master robot or the slave robot is located at a place where it is difficult to communicate with a server.

In this case, since the slave robot is unable to receive relative position information from the server, the slave robot is unable to know the position of the master robot. As a result, there may arise a problem that follow-up or collaboration among a plurality of robot cleaners is not efficiently performed.

Furthermore, the robot cleaner changes its moving direction several times while moving to clean a designated cleaning space. For example, it is often required to change a current moving direction frequently changes depending on a shape of a cleaning space, a moving mode of the robot cleaner, detection of an obstacle, a topographic feature of the floor, and the like. Accordingly, a complex trajectory may be left or a complex moving path may be formed.

When any one of the plurality of robot cleaners follows another one to perform collaboration cleaning, there is a case where it is difficult for a following cleaner to follow a complex moving path formed by a leading cleaner. Furthermore, even when such follow-up is possible, there is a problem that the entire cleaning time is delayed. This is also the same for a plurality of mobile robots capable of collaboration.

SUMMARY OF THE INVENTION

An object of the present disclosure is to provide a plurality of mobile robots capable of moving while any one thereof follows a moving path of another one thereof so that there is no interference or collision with each other, and a control method thereof.

Furthermore, another object of the present disclosure is to provide a plurality of mobile robots that can be controlled to perform flexible follow-up without any interruption when any one of the plurality of mobile robots follows another one thereof, and a control method thereof.

Furthermore, still another object of the present disclosure is to provide a plurality of mobile robots capable of following roughly in consideration of flexibility and cleaning time when a moving region itself is a complex region or leaves a complex moving trajectory or forms a complex moving path, or in a situation where it is judged to have a large delay of move completion time while moving on the same path as that of the leading mobile robot, and a control method thereof.

Furthermore, yet still another object of the present disclosure is to provide a plurality of mobile robots capable of preventing follow-up from being interrupted and minimizing the occurrence of a delay of move completion time when the cleaning space is a complex region, or even when a leading mobile robot leaves a complex movement trajectory or forms a complex moving path while performing follow-up moving between the plurality of mobile robots, and a control method thereof.

Furthermore, still yet another object of the present disclosure is to provide a plurality of mobile robots implemented to continue follow-up moving while minimizing a move completion delay even when movable regions are different from each other due to a difference in the types and specifications of the plurality of mobile robots, and a control method thereof.

Furthermore, yet still another object of the present disclosure is to provide a plurality of mobile robots implemented to perform follow-up moving in a predetermined sector unit when it is sufficient to perform an intrinsic function even though a following mobile robot is not required to follow a moving path of a leading mobile robot as it is, and a control method thereof.

Accordingly, in the present disclosure, it is implemented that a following mobile robot stores the trajectory information of a leading mobile robot and moves while following a moving path corresponding to the stored trajectory information so as to efficiently perform flexible follow-up without any interruption among a plurality of mobile robots.

On the other hand, depending on a situation such as a difference in the types and specifications of the plurality of mobile robots, a state of the floor, presence of an obstacle, an operation state of the mobile robot, and complexity of a moving path corresponding to trajectory information, an exception may be preferably recognized when it is suitable for the moving completion time and efficiency that a following mobile robot is unable to follow or does not follow a moving path of a leading mobile robot.

As a result, when a moving path corresponding to subsequent trajectory information to be followed by the following mobile robot satisfies a predetermined condition, it is implemented that at least part of the stored trajectory information is removed and the remaining trajectory information is followed.

Here, whether or not the moving path corresponding to subsequent trajectory information to be followed satisfies a predetermined condition may be determined by information on an obstacle acquired based on a signal sent and received through the memory, the sensor, and the communication unit, identification information of the mobile robot, information associated with an operation state of the mobile robot, and floor state information on which the mobile robot is located.

Specifically, a mobile robot according to an embodiment of the present disclosure may include a traveling unit configured to move a main body; a memory configured to store trajectory information of a moving path corresponding to the movement of the main body; a communication unit configured to communicate with another mobile robot that emits a signal; and a controller configured to recognize the location of the another mobile robot based on the signal, and control the another mobile robot to follow a moving path corresponding to the stored trajectory information based on the recognized location, wherein the controller controls the moving of the another mobile robot to remove at least part of the stored trajectory information, and allow the another mobile robot to follow a moving path corresponding to the remaining trajectory information in response to whether the moving path corresponding to next trajectory information to be followed by the another mobile robot satisfies a specified condition.

Furthermore, in one embodiment, whether or not the moving path corresponding to next trajectory information to be followed by the another mobile robot satisfies a specified condition may be determined based on at least one of information on an obstacle sensed through a sensor of the main body, identification information of the another mobile robot, information related to an operating state of the another mobile robot, and floor state information on which the another mobile robot is located.

Furthermore, in one embodiment, trajectory information followed by the another mobile robot in the trajectory information stored in the memory may be deleted from the memory.

Furthermore, in one embodiment, when a moving path corresponding to first trajectory information to be followed at a current location of the another mobile robot satisfies a specified condition, the controller may transmit a control command for moving the another mobile robot to a location corresponding to second trajectory information stored subsequent to the first trajectory information.

Furthermore, in one embodiment, at least one intermediate trajectory information may be included between the first trajectory information and the second trajectory information, and the controller may delete the first trajectory information and the one or more intermediate trajectory information from the memory in response to the movement of the another mobile robot to a location corresponding to the second trajectory information.

Furthermore, in one embodiment, when it is sensed that a plurality of obstacles have approached a location of next trajectory information to be followed at a current location of the another mobile robot, the controller may control the moving of the another mobile robot to follow the main body on another moving path instead of a moving path including the next trajectory information.

Furthermore, in one embodiment, the controller may control moving to allow the another mobile robot to follow a moving path corresponding to the stored trajectory information in a sector unit, and a single sector may include a moving path corresponding to a plurality of trajectory information.

Furthermore, in one embodiment, the controller may control the another mobile robot to move on a moving path different from a moving path of the main body corresponding to a plurality of trajectory information in response to the satisfaction of the specified condition, and the different moving path may have a shorter path length than the moving path of the main body.

Furthermore, in one embodiment, the controller may control the moving of the another mobile robot in a sector unit including a plurality of trajectory information, remove all trajectory information in a current sector in response to the satisfaction of the specified condition, determine a next sector based on the current location and moving direction of the another mobile robot, and control the moving of the another mobile robot to follow one of the trajectory information in the determined next sector.

Furthermore, in one embodiment, the controller may output a control command to change or stop a moving speed of the main body when the another mobile robot moves away from the main body to follow one of the trajectory information in the determined next sector.

Furthermore, in one embodiment, the controller may change at least one of a size and a location of a next sector to detect the next trajectory information of the main body in response to the non-detection of the next trajectory information of the main body in the next sector.

Furthermore, in one embodiment, the controller may increase the number of sectors to detect the next trajectory information of the main body in response to the non-detection of the next trajectory information of the main body in the next sector.

Furthermore, in one embodiment, the controller may stop the moving of the another mobile robot until the main body enters into the next sector in response to the non-detection of the next trajectory information of the main body in the next sector.

Furthermore, in one embodiment, the controller may control the moving of the another mobile robot to move on a path connected by a shortest straight line from a current location of the another mobile robot to a current location of the main body, instead of a moving path corresponding to the trajectory information of the main body detected for a predetermined period of time, in response to a change in the moving direction of the main body more than a reference number of times for the predetermined period of time.

Furthermore, in one embodiment, the controller may control the moving of the another mobile robot to remove the trajectory information of the main body in a moving region in which the main body has entered, and follow trajectory information after the main body moves out of the relevant moving region in response to whether a width of the entered moving region is sensed less than a reference range.

Furthermore, in one embodiment, the controller may transmit a signal corresponding to a moving stop command to the another mobile robot when it is determined that a region in which the main body enters a non-entry region of the another mobile robot, and control the moving of the another mobile robot to follow a moving path corresponding to the trajectory information of the main body stored subsequent to moving out of the relevant region when it is sensed that the main body moves out of the relevant region.

In addition, a plurality of mobile robots according to an embodiment of the present disclosure may be a plurality of mobile robots including a first mobile robot and a second mobile robot, wherein the first mobile robot communicates with the second mobile robot that emits a signal to recognize the location of the second mobile robot, stores the trajectory information of a moving path corresponding to the movement of the first mobile robot, and controls the second mobile robot to follow a moving path corresponding to the stored trajectory information based on the recognized location of the second mobile robot, and the first mobile robot removes at least part of the stored trajectory information, and controls the second mobile robot to follow a moving path corresponding to the remaining trajectory information in response to whether the moving path corresponding to next trajectory information to be followed at a current location of the second mobile robot satisfies a specified condition.

In addition, a control method of a mobile robot according to an embodiment of the present disclosure may include storing trajectory information of a moving path corresponding to the movement of a mobile robot main body; communicating with another mobile robot that emits a signal to recognize the location of the another mobile robot; controlling the moving of the another mobile robot such that the another mobile robot follows a moving path corresponding to the stored trajectory information based on the recognized location; sensing that a moving path corresponding to next trajectory information to be followed by the another mobile robot satisfies a specified condition; and controlling the moving of the another mobile robot to remove part of the stored trajectory information such that the another mobile robot follows a moving path corresponding to the remaining trajectory information according to the sensing.

Furthermore, in one embodiment, whether or not the specified condition is satisfied may be determined by at least one of information on an obstacle sensed through a sensor of the main body, identification information of the another mobile robot, information related to an operating state of the another mobile robot, and floor state information at a current location of the another mobile robot.

Furthermore, in one embodiment, the method may further include deleting trajectory information followed by the another mobile robot from the stored trajectory information.

As described above, according to a plurality of mobile robots according to an embodiment of the present disclosure, a following mobile robot may perform cleaning while sequentially following a movement trajectory of a leading mobile robot at normal times, but roughly follow the leading mobile robot by omitting part of the movement trajectory of the leading mobile robot when the movement trajectory is detected within in a complex region or forms a complex sector, thereby solving a delay problem in the move completion time while maintaining the cleaning efficiency according to follow-up.

In addition, when the leading mobile robot changes its moving direction or enters a narrow region several times in a short period of time even if it does not encounter a complex region or sector, the following mobile robot may be controlled to move straight and follow the leading mobile robot by removing a movement trajectory for a predetermined period of time or a movement trajectory in a narrow region, thereby minimizing a time delay due to follow-up.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Hereinafter, a mobile robot according to the present disclosure will be described in detail with reference to the accompanying drawings.

Hereinafter, description will be given in detail of embodiments disclosed herein. Technical terms used in this specification are merely used for explaining specific embodiments, and should not be construed to limit the scope of the technology disclosed herein.

First, the term "mobile robot" disclosed herein may be used as the same meaning as "robot (for a specific function)," "robot cleaner," "robot for cleaning" and "autonomous cleaner," and those terms will be used equally.

Furthermore, the term "a plurality of mobile robots" disclosed in the present disclosure may be used as "a plurality of robot cleaners" or "a plurality of cleaners". Furthermore, the term a "first mobile robot" may be named a "first robot", a "first robot cleaner", a "first cleaner", or a "leading cleaner". Furthermore, a "second mobile robot" may be named a "second robot", a "second robot cleaner", a "second cleaner", or a "following cleaner".

Figure 1:
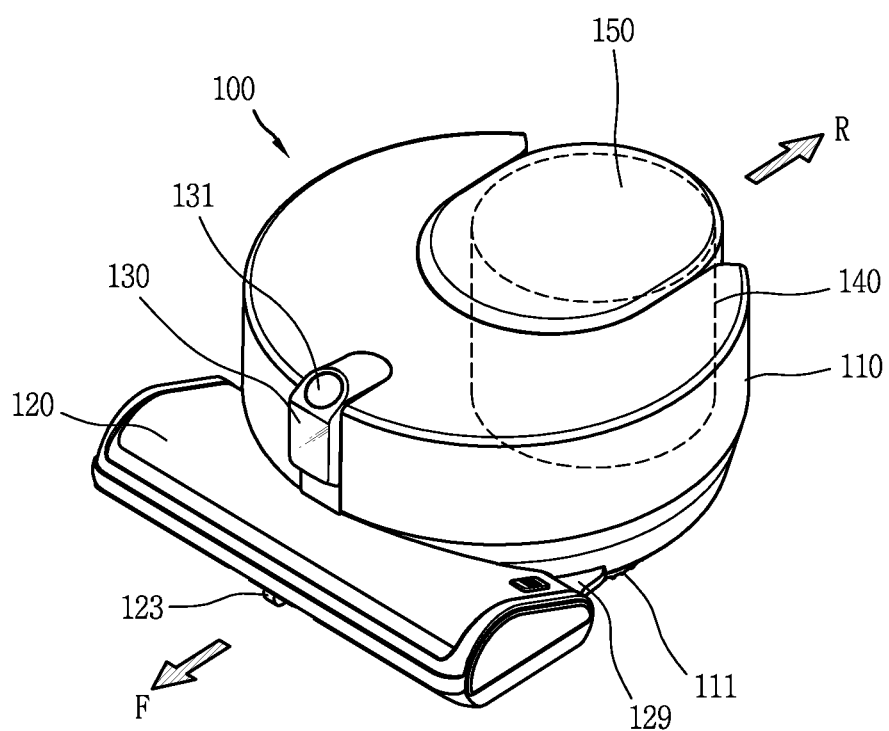
FIG. 1 is a perspective view showing an example of a mobile robot according to the present disclosure.
Figure 2:
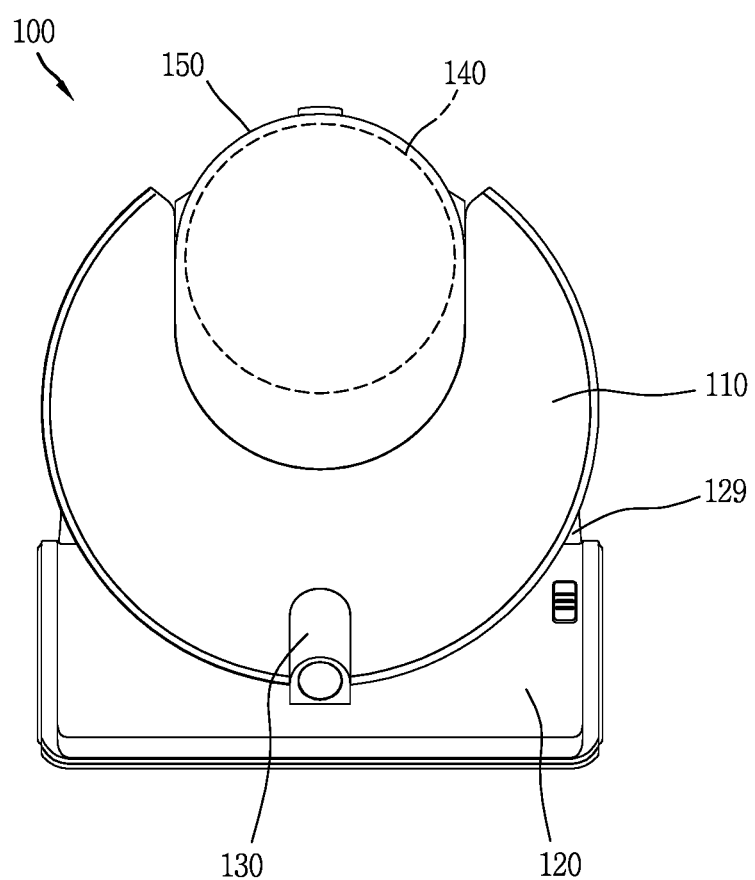
FIG. 2 is a plan view of the mobile robot illustrated in FIG. 1.
Figure 3:
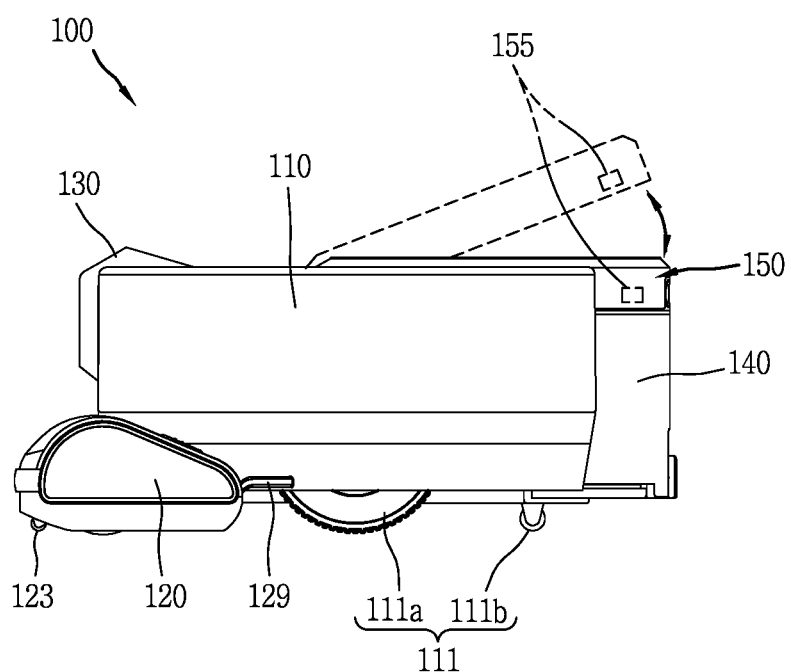
FIG. 3 is a side view of the mobile robot illustrated in FIG. 1.

FIGS. 1 to 3 illustrate a robot cleaner as an example of a mobile robot according to the present disclosure.

Specifically, FIG. 1 is a perspective view showing an example of a mobile robot 100 according to the present disclosure, and FIG. 2 is a plan view of the mobile robot 100 illustrated in FIG. 1, and FIG. 3 is a side view of the mobile robot 100 illustrated in FIG. 1.

In this specification, a mobile robot, a robot cleaner, and a cleaner that performs autonomous moving may be used in the same sense. Furthermore, in this specification, a plurality of cleaners described as an example of a plurality of mobile robots may include at least part of configurations illustrated in FIGS. 1 to 3.

Referring to FIGS. 1 through 3, the robot cleaner 100 performs a function of cleaning a floor while moving on a predetermined area by itself. Cleaning of a floor mentioned here includes sucking dust (including foreign matter) on the floor or mopping the floor.

The robot cleaner 100 may include a cleaner main body 110, a cleaning unit 120, a sensing unit 130, and a dust container 140.

The cleaner main body 110 is provided with various components in addition to a controller (not illustrated) for controlling the robot cleaner 100. In addition, the cleaner main body 110 is provided with a wheel unit 111 for the moving of the robot cleaner 100. The robot cleaner 100 may move forward, backward, leftward and rightward by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the controller. Each of the main wheels 111a may be configured to be driven independently of each other. For example, each main wheel 111a may be driven by a different motor. Or each main wheel 111a may be driven by a plurality of different axes provided in one motor.

The sub wheel 111b is configured to support the cleaner body 110 along with the main wheel 111a and assist the moving of the robot cleaner 100 by the main wheel 111a. The sub wheel 111b may also be provided on a cleaning unit 120 to be described later.

The controller is configured to control the driving of the wheel unit 111 in such a manner that the robot cleaner 100 autonomously moves on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

In FIG. 1, a cleaning unit 120 may be disposed in a protruding form from one side of the cleaner main body 110, so as to suck air containing dust or mop an area. The one side may be a side where the cleaner main body 110 moves in a forward direction F, that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The vacant space is a space between both left and right end portions of the cleaner body 110 and both left and right end portions of the cleaning unit 120, and has a shape recessed in an inward direction of the robot cleaner 100.

When an obstacle is caught in the vacant space, the robot cleaner 100 may be blocked by an obstacle not to move. In order to prevent this, a cover member 129 may be disposed to cover at least part of the vacant space.

The cover member 129 may be provided on the cleaner main body 110 or the cleaning unit 120. According to the present embodiment, it is shown that the cover member 129 is formed in a protruding manner on both sides of a rear end portion of the cleaning unit 120, and disposed to cover an outer peripheral surface of the cleaner body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. In other words, as the cover member 129 is disposed to cover the outer circumferential surface of the cleaner main body 110, a relative position of the cleaning unit 120 with respect to the cleaner main body 110 may be determined.

The cleaning unit 120 may be provided with a castor 123. The castor 123 is configured to assist the moving of the robot cleaner 100, and also support the robot cleaner 100.

The cleaner main body 110 is provided with the sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 to sense an obstacle or geographic feature in front of the robot cleaner 100 so that the cleaning unit 120 positioned at the forefront of the robot cleaner 100 does not collide with the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the controller. For example, the camera 131 may transmit an electrical signal corresponding to an upward image to the controller. The electrical signal corresponding to the upward image may be used by the controller to detect the position of the cleaner main body 110.

In addition, the sensing unit 130 may detect obstacles such as walls, furniture, and cliffs on a moving surface or a moving path of the robot cleaner 100. Also, the sensing unit 130 may sense presence of a docking device that performs battery charging. Also, the sensing unit 130 may detect ceiling information so as to map a moving area or a cleaning area of the robot cleaner 100.

The cleaner main body 110 is provided with a dust container 140 detachably coupled thereto for separating and collecting dust from sucked air.

The dust container 140 is provided with a dust container cover 150 which covers the dust container 140. In an embodiment, the dust container cover 150 may be coupled to the cleaner main body 110 by a hinge to be rotatable.

The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. Dust is collected in the dust box 140, and air is discharged from the dust box 140 and then discharged to the outside.

An embodiment related to the components of the robot cleaner 100 will be described below with reference to FIG. 4.

The robot cleaner 100 or the mobile robot according to an embodiment of the present disclosure may include a communication unit 1100, an input unit 1200, a traveling unit 1300, a sensing unit 1400, an output unit 1500, a power supply unit 1600, a memory 1700, a controller 1800, and a cleaning unit 1900, or a combination thereof.

Figure 4:
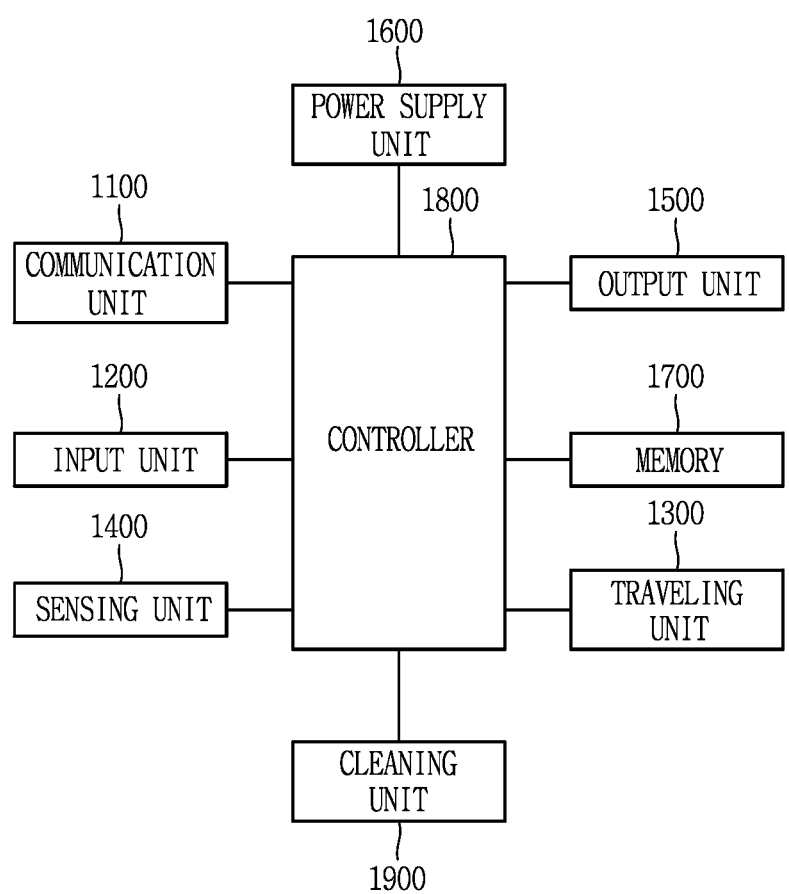
FIG. 4 is a block diagram showing exemplary components of a mobile robot according to an embodiment of the present disclosure.

Here, it is needless to say that the components shown in FIG. 4 are not essential, and thus a robot cleaner having more or fewer components than shown in FIG. 4 may be implemented. Also, as described above, each of a plurality of robot cleaners described in the present disclosure may equally include only some of components to be described below. In other words, a plurality of robot cleaners may include different components.

Hereinafter, each component will be described.

First, the power supply unit 1600 includes a battery that can be charged by an external commercial power supply, and supplies power to the mobile robot. The power supply unit 1600 supplies driving power to each of the components included in the mobile robot to supply operating power required for the mobile robot to move or perform a specific function.

Here, the controller 1800 may sense the remaining power of the battery, and control the battery to move power to a charging base connected to the external commercial power source when the remaining power is insufficient, and thus a charge current may be supplied from the charging base to charge the battery. Also, as described above, each of a plurality of robot cleaners described in the present disclosure may equally include only some of components to be described below. The output unit 1500 may display the remaining battery level under the control of the controller.

The battery may be located in a lower portion of the center of the robot cleaner or may be located at either one of the left and right sides. In the latter case, the mobile robot may further include a balance weight for eliminating a weight bias of the battery.

The controller 1800 performs a role of processing information based on an artificial intelligence technology and may include at least one module for performing at least one of learning of information, inference of information, perception of information, and processing of a natural language.

The controller 1800 may use a machine learning technology to perform at least one of learning, inference and processing of a large amount of information (big data), such as information stored in the cleaner, environment information around the cleaner, information stored in a communicable external storage, and the like. Furthermore, the controller 1800 may predict (or infer) at least one executable operation of the cleaner based on information learned using the machine learning technology, and control the cleaner to execute the most feasible operation among the at least one predicted operation.

Machine learning technology is a technology that collects and learns a large amount of information based on at least one algorithm, and judges and predicts information based on the learned information. The learning of information is an operation that grasps characteristics, rules, and judgment criteria of information, quantifies relationship between information and information, and predicts new data using a quantified pattern.

The at least one algorithm used by the machine learning technology may be a statistical based algorithm, for example, a decision tree that uses a tree structure type as a prediction model, an artificial neural network copying neural network architecture and functions, genetic programming based on biological evolutionary algorithms, clustering to distribute observed examples into subsets of clusters, Monte Carlo method to compute function values through randomly extracted random numbers from probability, or the like.

As a field of machine learning technology, deep learning is a technique that performs at least one of learning, judging, and processing of information using an Artificial Neural Network (ANN) or a Deep Neuron Network (DNN) algorithm. The deep neural network (DNN) may have a structure of linking layers and transferring data between the layers. This deep learning technology may be employed to learn a vast amount of information through the deep neural network (DNN) using a graphic processing unit (GPU) optimized for parallel computing.

The controller 1800 may use training data stored in an external server or a memory, and may include a learning engine for detecting a characteristic for recognizing a predetermined object. Here, characteristics for recognizing an object may include the size, shape, and shade of the object.

Specifically, when the controller inputs a part of an image acquired through the camera provided in the cleaner to a learning engine, the learning engine may recognize at least one object or creature included in the input image.

In this way, when the learning engine is applied to the moving of the cleaner, the controller 1800 may recognize whether or not there exists an obstacle that obstructs the moving of the cleaner, such as a chair leg, a fan, a specific type of balcony gap, or the like, thereby enhancing the efficiency and reliability of the moving of the cleaner.

Meanwhile, the learning engine as described above may be mounted on the controller 1800 or may be mounted on an external server. When the learning engine is mounted on an external server, the controller 1800 may control the communication unit 1100 to transmit at least one image that is subjected to analysis to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the traveling unit 1300 may include a motor, and operate the motor to bidirectionally rotate left and right main wheels, so that the main body can rotate or move. At this time, the left and right main wheels may be independently moved. The traveling unit 1300 may allow the main body of the mobile robot to move forward, backward, leftward and rightward, or perform curved moving or in-place rotation.

Meanwhile, the input unit 1200 receives various control commands for the robot cleaner from the user. The input unit 1200 may include one or more buttons, for example, the input unit 1200 may include an OK button, a set button, and the like. The OK button is a button for receiving a command for confirming sensing information, obstacle information, position information, and map information from the user, and the set button is a button for receiving a command for setting the information from the user.

In addition, the input unit 1200 may include an input reset button for canceling a previous user input and receiving a user input again, a delete button for deleting a preset user input, a button for setting or changing an operation mode, a button for receiving a command to be restored to the charging base, and the like.

Furthermore, the input unit 1200, such as a hard key, a soft key, a touch pad, or the like, may be installed on a upper portion of the mobile robot. In addition, the input unit 1200 may have a form of a touch screen along with the output unit 1500.

On the other hand, the output unit 1500 may be installed on an upper portion of the mobile robot. Of course, the installation location and installation type may vary. For example, the output unit 1500 may display a battery state, a moving mode, and the like on the screen.

In addition, the output unit 1500 may output state information inside the mobile robot detected by the sensing unit 1400, for example, a current state of each configuration included in the mobile robot. Moreover, the output unit 1500 may display external state information, obstacle information, position information, map information, and the like detected by the sensing unit 1400 on the screen. The output unit 1500 may be formed with any one of a light emitting diode (LED), a liquid crystal display (LCD), a plasma display panel, and an organic light emitting diode (OLED).

The output unit 1500 may further include a sound output device for audibly outputting an operation process or an operation result of the mobile robot performed by the controller 1800. For example, the output unit 1500 may output a warning sound to the outside in accordance with a warning signal generated by the controller 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure may output environment information on a moving area on the screen or output it as sound. According to another embodiment, the mobile robot may transmit map information or environment information to a terminal device through the communication unit 1100 to output a screen or sound to be output through the output unit 1500.

The memory 1700 stores a control program for controlling or driving the robot cleaner and the resultant data. The memory 1700 may store audio information, image information, obstacle information, position information, map information, and the like. Furthermore, the memory 1700 may store information related to a moving pattern.

The memory 1700 mainly uses a nonvolatile memory. Here, the non-volatile memory (NVM, NVRAM) is a storage device capable of continuously storing information even when power is not supplied thereto, and for an example, the non-volatile memory may be a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an external signal detection sensor, a front detection sensor, a cliff detection sensor, a two-dimensional camera sensor, and a three-dimensional camera sensor.

The external signal detection sensor may sense an external signal of the mobile robot. The external signal detection sensor may be, for example, an infrared ray sensor, an ultrasonic sensor, an radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. That is, the mobile robot may determine a current position and set a moving direction by receiving a signal transmitted from the charging base, thereby returning to the charging base.

On the other hand, the front sensors or front detection sensors may be provided at regular intervals on a front side of the mobile robot, specifically, along a side outer circumferential surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the controller 1800. In other words, the front detection sensor may sense a protrusion on the moving path of the mobile robot, a household appliance, a furniture, a wall, a wall corner, and the like, and transmit the information to the controller 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may include a transmitter and a receiver, and the controller 1800 may determine whether or not there exists an obstacle based on whether or not ultrasonic waves radiated through the transmitter is reflected by the obstacle or the like and received at the receiver, and calculate a distance to the obstacle using the ultrasonic emission time and ultrasonic reception time.

Furthermore, the controller 1800 may compare ultrasonic waves emitted from the transmitter and ultrasonic waves received at the receiver to detect information related to a size of the obstacle. For example, the controller 1800 may determine that the larger the obstacle is, the more ultrasonic waves are received at the receiver.

In one embodiment, a plurality (e.g., five) of ultrasonic sensors may be installed on side surfaces of the mobile robot at the front side along an outer circumferential surface. At this time, the ultrasonic sensors may preferably be installed on the front surface of the mobile robot in a manner that the transmitter and the receiver are alternately arranged.

In other words, the transmitters may be spaced apart from the front center of the main body to the left and right sides, and one or two (or more) transmitters may be disposed between the receivers to form a receiving area of ultrasonic signals reflected from an obstacle or the like. With this arrangement, the receiving area may be expanded while reducing the number of sensors. A transmission angle of ultrasonic waves may maintain a range of angles that do not affect different signals to prevent a crosstalk phenomenon. Furthermore, the receiving sensitivities of the receivers may be set to be different from each other.

In addition, the ultrasonic sensor may be installed upward by a predetermined angle to output ultrasonic waves transmitted from the ultrasonic sensor in an upward direction, and here, the ultrasonic sensor may further include a predetermined blocking member to prevent ultrasonic waves from being radiated downward.

On the other hand, as described above, the front detection sensor may use two or more types of sensors together, and accordingly, the front detection sensor may use any one type of infrared sensors, ultrasonic sensors, RF sensors, and the like.

For example, the front detection sensor may include an infrared sensor as a different type of sensor other than the ultrasonic sensor.

The infrared sensor may be installed on an outer circumferential surface of the mobile robot together with the ultrasonic sensor. The infrared sensor may also sense an obstacle existing at the front or the side to transmit obstacle information to the controller 1800. In other words, the infrared sensor may sense a protrusion on the moving path of the mobile robot, a household appliance, a furniture, a wall, a wall corner, and the like, and transmit the information to the controller 1800. Therefore, the mobile robot may move within a specific region without collision with the obstacle.

On the other hand, a cliff detection sensor (or cliff sensor) may sense an obstacle on the floor supporting the main body of the mobile robot mainly using various types of optical sensors.

In other words, the cliff detection sensor may be installed on a rear surface of the bottom mobile robot, but may of course be installed in a different position depending on the type of the mobile robot. The cliff detection sensor is a sensor located on a back surface of the mobile robot to sense an obstacle on the floor, and the cliff detection sensor may be an infrared sensor, an ultrasonic sensor, an RF sensor, a PSD (Position Sensitive Detector) sensor, or the like, which is provided with a transmitter and a receiver such as the obstacle detection sensor.

For an example, any one of the cliff detection sensors may be installed in front of the mobile robot, and the other two cliff detection sensors may be installed relatively behind.

For example, the cliff detection sensor may be a PSD sensor, but may also be configured with a plurality of different kinds of sensors.

The PSD sensor detects a short and long distance position of incident light with one p-n junction using a semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. As a type of infrared sensor, the PSD sensor uses infrared rays. The PSD sensor emits infrared ray, and measures a distance by calculating an angle of the infrared ray reflected and returned from an obstacle. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The cleaning unit 1900 cleans a designated cleaning area according to a control command transmitted from the controller 1800. The cleaning unit 1900 scatters dust in the vicinity through a brush (not shown) that scatters dust in a designated cleaning area, and then drives the suction fan and the suction motor to suck the scattered dust. In addition, the cleaning unit 1900 may perform mopping in a designated cleaning area according to the replacement of the configuration.

Furthermore, the controller 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the controller 1800 may determine whether to pass a cliff or not according to a ground state of the detected cliff by using the cliff detection sensor, and decide whether to pass the cliff or not according to the determination result. For example, the controller 1800 determines whether or not a cliff is present and a depth of the cliff through the cliff detection sensor, and then passes through the cliff only when a reflection signal is sensed through the cliff detection sensor.

For another example, the controller 1800 may determine a lifting phenomenon of the mobile robot using the cliff detection sensor.

On the other hand, the two-dimensional camera sensor is provided on one side of the mobile robot to acquire image information related to the surroundings of the main body during movement.

An optical flow sensor converts a downward image input from an image sensor provided in the sensor to generate image data in a predetermined format. The generated image data may be stored in the memory 1700.

Furthermore, one or more light sources may be installed adjacent to the optical flow sensor. The one or more light sources irradiate light to a predetermined region of the bottom surface captured by the image sensor. In other words, when the mobile robot moves in a specific region along the bottom surface, a predetermined distance is maintained between the image sensor and the bottom surface when the bottom surface is flat. On the other hand, when the mobile robot moves on a bottom surface having a nonuniform surface, the robot moves away from the bottom surface by more than a predetermined distance due to the irregularities of the bottom surface and obstacles. At this time, the one or more light sources may be controlled by the controller 1800 to adjust an amount of light to be irradiated. The light source may be a light emitting device capable of controlling the amount of light, for example, a light emitting diode (LED) or the like.

Using the optical flow sensor, the controller 1800 may detect a position of the mobile robot irrespective of the slip of the mobile robot. The controller 1800 may compare and analyze the image data captured by the optical flow sensor over time to calculate the moving distance and the moving direction, and calculate the position of the mobile robot on the basis of the moving distance and the moving direction. Using image information on a bottom side of the mobile robot using the optical flow sensor, the controller 1800 may perform slip-resistant correction on the position of the mobile robot calculated by another device.

The three-dimensional camera sensor may be attached to one side or a part of the main body of the mobile robot to generate three-dimensional coordinate information related to the surroundings of the main body.

In other words, the three-dimensional camera sensor may be a 3D depth camera that calculates a near and far distance of the mobile robot and an object to be captured.

Specifically, the three-dimensional camera sensor may capture a two-dimensional image related to the surroundings of the main body, and generate a plurality of three-dimensional coordinate information corresponding to the captured two-dimensional image.

In one embodiment, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another embodiment, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the three-dimensional camera sensor may include first and second lasers, wherein the first laser irradiates a linear shaped laser intersecting each other, and the second laser irradiates a single linear shaped laser. According to this, the lowermost laser is used to sense obstacles in the bottom portion, the uppermost laser is used to sense obstacles in the upper portion, and the intermediate laser between the lowermost laser and the uppermost laser is used to sense obstacles in the middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like.

The another device may also be a device for controlling a door, a window, a water supply valve, a gas valve, or the like. The another device may also be a sensor for detecting temperature, humidity, air pressure, gas, or the like.

Further, the communication unit 1100 may communicate with another robot cleaner 100 located in a specific area or within a predetermined range.

Figure 5A:
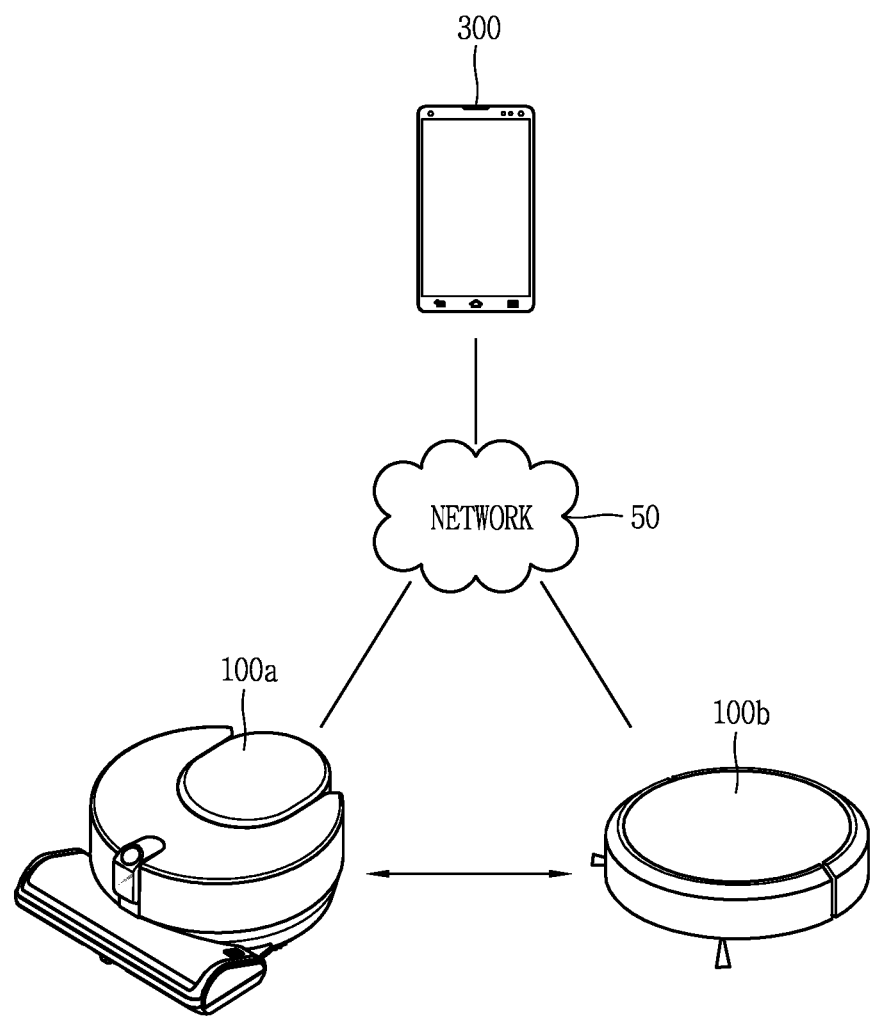
FIG. 5A is a conceptual view illustrating network communication between a plurality of mobile robots according to an embodiment of the present disclosure.
Figure 5B:
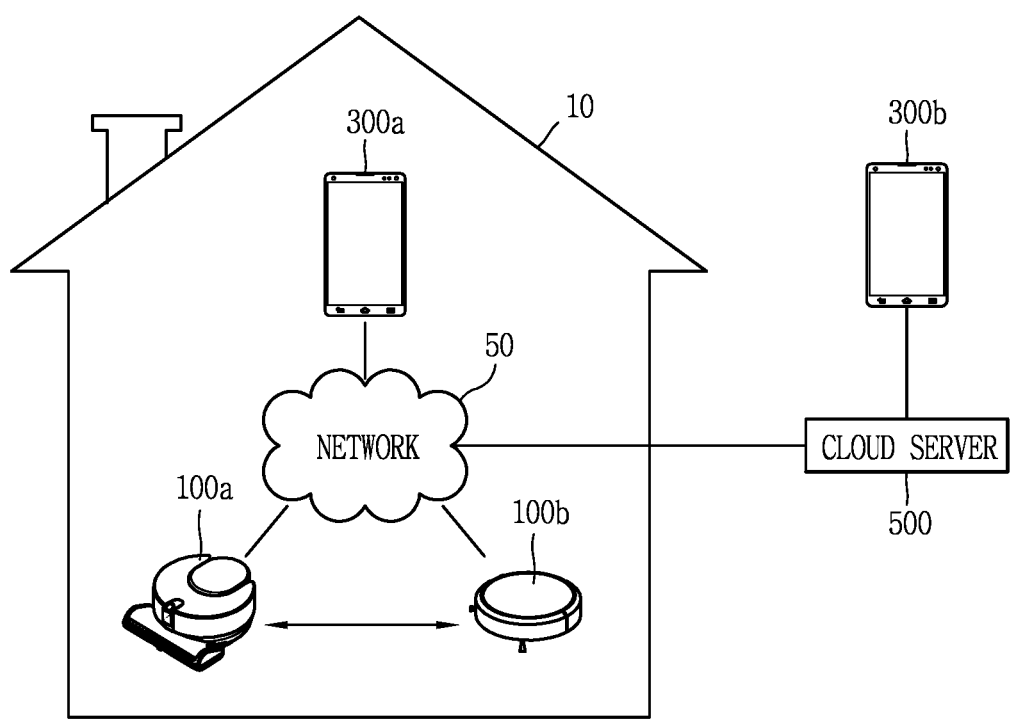
FIG. 5B is a conceptual view illustrating an example of the network communication of FIG. 5A.

Referring to FIGS. 5A and 5B, a first cleaner 100a and a second cleaner 100b that perform autonomous moving may exchange data with each other through network communication 50. In addition, the first cleaner 100a and/or the second cleaner 100b that perform autonomous moving may perform a cleaning related operation or a corresponding operation by a control command received from a terminal 300 through the network communication 50 or other communication.

In other words, although not shown, a plurality of cleaners 100a, 100b that perform autonomous moving may also perform communication with the terminal 300 through a first network communication and perform communication with each other through a second network communication.

Here, the network communication 50 may refer to short-range communication using at least one of wireless communication technologies, such as a wireless LAN (WLAN), a wireless personal area network (WPAN™), a wireless fidelity (Wi-Fi) Wi-Fi Direct™, Digital Living Network Alliance (DLNA), Wireless Broadband (WiBro), World Interoperability for Microwave Access (WiMAX™), Zigbee™, Zwave™, Blue-Tooth™, Radio Frequency Identification (RFID), Infrared Data Association (IrDA), Ultrawide-Band (UWB), Wireless Universal Serial Bus (USB), and the like.

The network communication 50 may vary depending on a communication mode of the robot cleaners desired to communicate with each other.

In FIG. 5A, the first cleaner 100a and/or the second cleaner 100b that perform autonomous moving may provide information sensed by the respective sensing units thereof to the terminal 300 through the network communication 50. The terminal 300 may also transmit a control command generated based on the received information to the first cleaner 100a and/or the second cleaner 100b via the network communication 50.

In FIG. 5A, the communication unit of the first cleaner 100a and the communication unit of the second cleaner 100b may also directly communicate with each other or indirectly communicate with each other via another router (not shown), to recognize information related to a moving state and positions of counterparts.

In one example, the second cleaner 100b may perform a moving operation and a cleaning operation according to a control command received from the first cleaner 100a. In this case, it may be said that the first cleaner 100a operates as a master and the second cleaner 100b operates as a slave. Alternatively, it may be said that the second cleaner 100b follows the first cleaner 100a. In some cases, it may also be said that the first cleaner 100a and the second cleaner 100b collaborate with each other.

Hereinafter, a system including a plurality of cleaners 100a, 100b performing autonomous moving according to an embodiment of the present disclosure will be described with reference to FIG. 5B.

As illustrated in FIG. 5B, a cleaning system according to an embodiment of the present disclosure may include a plurality of cleaners 100a, 100b performing autonomous moving, a network 50, a server 500, and a plurality of terminals 300a and 300b.

The plurality of cleaners 100a, 100b, the network 50 and at least one terminal 300a may be disposed in a building 10 while another terminal 300b and the server 500 may be located outside the building 10.

The plurality of cleaners 100a, 100b are cleaners that perform cleaning while moving by themselves, and may perform autonomous moving and autonomous cleaning. Each of the plurality of cleaners 100a, 100b may include a communication unit 1100, in addition to the moving function and the cleaning function.

The plurality of cleaners 100a, 100b, the server 500 and the plurality of terminals 300a and 300b may be connected together through the network 50 to exchange data. To this end, although not shown, a wireless router such as an access point (AP) device and the like may further be provided. In this case, the terminal 300a located in the building (internal network) 10 may access at least one of the plurality of cleaners 100a, 100b through the AP device so as to perform monitoring, remote control and the like with respect to the cleaner. Also, the terminal 300b located in an external network may access at least one of the plurality of cleaners 100a, 100b through the AP device, to perform monitoring, remote control and the like with respect to the cleaner.

The server 500 may be wirelessly connected directly through the terminal 300b. Alternatively, the server 500 may be connected to at least one of the plurality of cleaners 100a, 100b without passing through the mobile terminal 300b.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

The server 500 may store firmware information, operation information (course information and the like) related to the plurality of cleaners 100a, 100b, and may register product information regarding the plurality of cleaners 100a, 100b. For example, the server 500 may be a server operated by a cleaner manufacturer or a server operated by an open application store operator.

In another example, the server 500 may be a home server that is provided in the internal network 10 and stores status information regarding the home appliances or stores contents shared by the home appliances. If the server 500 is a home server, information related to foreign substances, for example, foreign substance images and the like may be stored.

Meanwhile, the plurality of cleaners 100a, 100b may be directly connected to each other wirelessly via Zigbee™, Zwave™, Blue-Tooth™, Ultra-wide band, and the like. In this case, the plurality of cleaners 100a, 100b may exchange position information and moving information with each other.

At this time, any one of the plurality of cleaners 100a, 100b may be a master cleaner 100a and another may be a slave cleaner 100b. For example, the first cleaner 100a may be a dry cleaner that sucks dust on the cleaning floor, and the second cleaner 100b may be a wet cleaner that mops the floor cleaned by the first cleaner 100a. Furthermore, the structures and specifications of the first cleaner 100a and the second cleaner 100b may be different from each other.

In this case, the first cleaner 100a may control the moving and cleaning of the second cleaner 100b. In addition, the second cleaner 100b may perform moving and cleaning while following the first cleaner 100a. Here, an operation in which the second cleaner 100b follows the first cleaner 100a refers to an operation in which the second cleaner 100b performs moving and cleaning by following the first cleaner 100a while maintaining a proper distance from the first cleaner 100a.

Figure 5C:
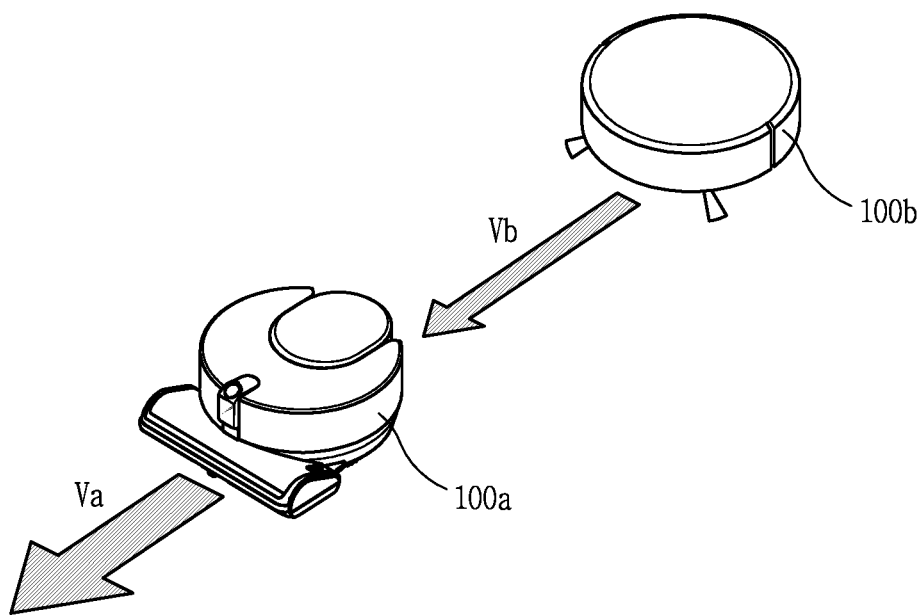
FIG. 5C is a conceptual view illustrating follow-up moving among a plurality of mobile robots according to an embodiment of the present disclosure.

Referring to FIG. 5C, the first cleaner 100a may control the second cleaner 100b such that the second cleaner 100b follows the first cleaner 100a.

For this purpose, the first cleaner 100a and the second cleaner 100b should exist in a specific area where they can communicate with each other, and the second cleaner 100b should recognize at least a relative position of the first cleaner 100a.

For example, the communication unit of the first cleaner 100a and the communication unit of the second cleaner 100b exchange IR signals, ultrasonic signals, carrier frequencies, impulse signals, and the like, and analyze them through triangulation, so as to calculate movement displacements of the first cleaner 100a and the second cleaner 100b, thereby recognizing relative positions of the first cleaner 100a and the second cleaner 100b. However, the present disclosure is not limited to this method, and one of the various wireless communication technologies described above may be used to recognize the relative positions of the first cleaner 100a and the second cleaner 100b through triangulation or the like. This will be described in more detail below.

When the first cleaner 100a recognizes the relative position with the second cleaner 100b, the second cleaner 100b may be controlled based on map information stored in the first cleaner 100a or map information stored in the server, the terminal or the like. In addition, the second cleaner 100b may share obstacle information sensed by the first cleaner 100a. The second cleaner 100b may perform an operation based on a control command (for example, a control command related to a moving direction, a moving speed, a stop, etc.) received from the first cleaner 100a.

Specifically, the second cleaner 100b performs cleaning while moving along a moving path of the first cleaner 100a. However, the moving directions of the first cleaner 100a and the second cleaner 100b do not always coincide with each other. For example, when the first cleaner 100a moves or rotates up/down/right/left, the second cleaner 100b may move or rotate up/down/right/left after a predetermined time, and thus current advancing directions of the first and second mobile robot 100a, 100b may differ from each other.

Also, a moving speed (Va) of the first cleaner 100a and a moving speed (Vb) of the second cleaner 100b may be different from each other.

The first mobile robot 100a may control the moving speed (Vb) of the second mobile robot 100b to vary in consideration of a distance at which the first mobile robot 100a and the second mobile robot 100b can communicate with each other. For example, if the first cleaner 100a and the second cleaner 100b move away from each other by a predetermined distance or more, the first cleaner 100a may control the moving speed (Vb) of the second cleaner 100b to be faster than before. On the other hand, when the first cleaner 100a and the second cleaner 100b move close to each other by a predetermined distance or less, the first cleaner 100a may control the moving speed (Vb) of the second cleaner 100b to be slower than before or control the second cleaner 100b to stop for a predetermined time. Accordingly, the second cleaner 100b can perform cleaning while continuously following the first cleaner 100a.

FIGS. 6, 7, 8A, 8B and 8C are views for specifically explaining a method of more flexibly performing follow-up while a plurality of mobile robots 100a, 100b according to an embodiment of the present disclosure maintain a predetermined distance from one another.

First, referring to FIG. 6, the concept of virtual impedance control applied to the present disclosure to allow the second cleaner 100b to follow the first cleaner 100a while the plurality of cleaners 100a, 100b avoid an obstacle without sudden acceleration/stop will be described.

Figure 6:
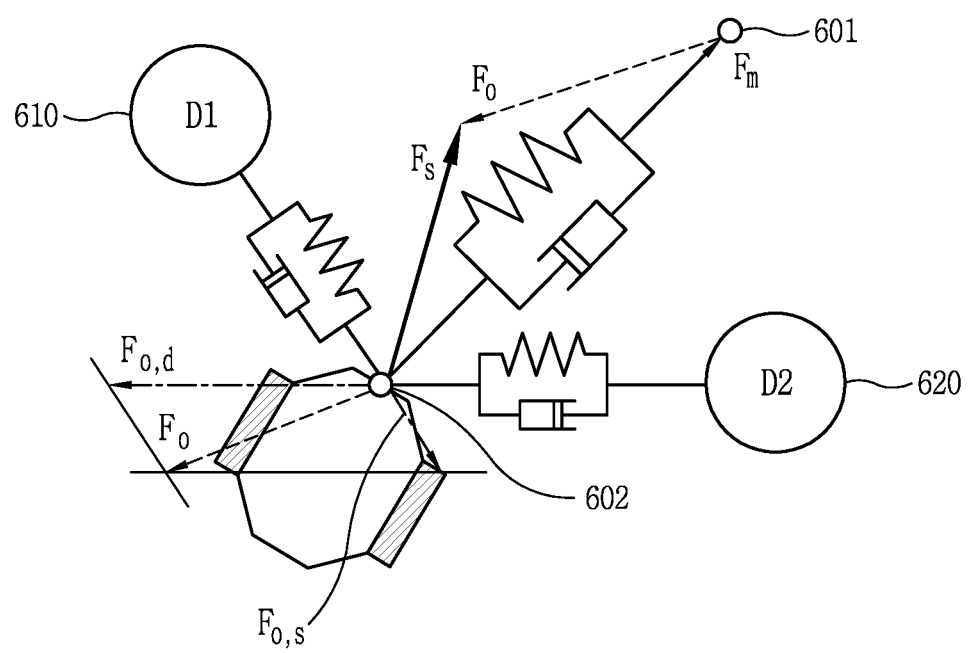
FIGS. 6, 7, 8A, 8B and 8C are views for specifically explaining a method of more flexibly performing follow-up while a plurality of mobile robots according to an embodiment of the present disclosure maintain a predetermined distance from one another.

In FIG. 6, it may be assumed that the mobile robot performs cleaning while moving from a first position 602 toward a second position 601. At this time, it may also be said that a mobile robot existing at the first position 602 follows another mobile robot existing at the second position 601.

When a mobile robot existing at the first position 602 follows another mobile robot existing at the second position 601, a plurality of obstacles (D1, D2) may exist within or in the vicinity of a moving path of the mobile robot. Here, either one (D1) of the plurality of obstacles (D1, D2) may be a fixed obstacle and the other one (D2) may be a moving obstacle.

The mobile robot may be provided with an obstacle sensor for sensing the plurality of obstacles (D1, D2). The obstacle sensors may be arranged at regular intervals along a side outer circumferential surface of the mobile robot, for example. The obstacle sensor may transmit a signal such as IR, ultrasonic waves and radio waves toward the plurality of obstacles (D1, D2) and receive a signal reflected from the plurality of obstacles (D1, D2) to determine a position of and a distance to the obstacle.

Virtual impedance control is a concept of modeling a relative distance and relative speed between the mobile robot and the obstacles (D1, D2) using a spring-damper, and then using the relationship of these forces to perform moving and follow-up while flexibly avoid obstacles.

Specifically, it is assumed that a repulsive force (FO) is generated between the mobile robot and the plurality of obstacles (D1, D2), and an attractive force (Fm) acts between the mobile robot and the second position 601 or the mobile robot at the first position 602 and another mobile robot at the second position 601, and an actual moving direction of the mobile robot is determined in the direction of a composite vector (Fs) of the repulsive force (FO) and the attractive force (Fm).

For example, in FIG. 6, under the assumption that there are springs and dampers between the plurality of obstacles (D1, D2) and the obstacle sensor, and respective distances from the plurality of obstacles (D1, D2) may be put into the springs, and respective speeds may be put into the dampers to calculate repulsive forces between the plurality of obstacles (D1, D2) and the cleaner.

To this end, 1) an attractive force (Fm) is calculated using a separation distance and speed difference from the mobile robot at the first position 602 at the head of the mobile robot at the second position 601. Next, 2) a first repulsive force (Fo, s) is obtained using a separation distance and speed difference between the first obstacle 610 and the mobile robot 602, and a second repulsive force (Fo, d) is obtained using a separation distance and speed difference between the second obstacle 620 and the mobile robot 602 to obtain a composite value (Fo) thereof. Then, 3) a repulsive force (Fo) obtained by combining the attractive force (Fm) and the previous composite value (Fo) is obtained. Finally, 4) the mobile robot moves in an Fs direction, which is a composite vector of the attractive force (Fm) calculated in the above 1) and the repulsive force composite value (Fo) calculated in the above 2).

On the other hand, in the foregoing concept of virtual impedance control, the mobile robot located at the front point 601, that is, the first cleaner 100a, actually continues to perform moving and cleaning, and continues to transmit information on the moving direction and the moving speed to the another mobile robot at the rear point 602, that is, the second cleaner 100b. In addition, the moving direction and moving speed of the first cleaner 100a may vary depending on the floor structure of the cleaning area, the dust condition, and the like.

When the first cleaner 100a and the second cleaner 100b perform cleaning independently, another cleaner may be regarded as an obstacle and only the repulsive force may be taken into account while moving. However, in the present disclosure, since the second cleaner 100b performs cleaning while following the first cleaner 100a, the attractive force (Fm) and the repulsive force (Fo) are alternately applied to the same object.

Specifically, while the second cleaner 100b follows the first cleaner 100a, the attractive force (Fm) and the repulsive force (Fo) may be alternated on the basis of the determined the follow-up distance.

In one example, the degree of alternation of the attractive force (Fm) and the repulsive force (Fo) may vary depending on the floor state of the cleaning area (e.g., inclination, flatness, presence of carpet, etc.), the presence of an obstacle, the dust state of a cleaning space (an area/spot requiring intensive cleaning), and the like.

Furthermore, here, the follow-up distance refers to a separation distance that must be maintained between the plurality of cleaners during follow-up. When a separation distance between the plurality of cleaners becomes too far from the follow-up distance, a relative position between each other may no longer be determined to discontinue the follow-up. On the contrary, when a separation distance between the plurality of cleaners becomes too small compared to the follow-up distance, the cleaners hit each other or suddenly stop to interfere with moving.

Accordingly, the controller of the first cleaner 100a may apply and control the attractive force (Fm) when a separation distance between the plurality of cleaners is within the follow-up distance or far from the follow-up distance, and apply and control the repulsive force (Fo) when the separation distance between the plurality of cleaners is within the follow-up distance.

The application of the attractive force (Fm) corresponds to the deceleration of the moving speed of the first cleaner 100a. Furthermore, the application of the repulsive force (Fo) corresponds to the acceleration of the moving speed of the first cleaner 100a.

To this end, each of the plurality of cleaners 100a, 100b may continuously measure a relative position (e.g., distance, direction, etc.) using triangulation techniques based on signal values transmitted and received using an ultrasonic sensor, a BWM sensor, an IR sensor, and the like. In addition, the moving direction and the moving speed of the plurality of cleaners 100a, 100b, particularly, the first cleaner 100a at the head, are continuously calculated using signal values exchanged at two different time points.

The moving speed of the first cleaner 100a may be calculated through the following equation.

$$V1 = V0 + k(D\text{min} - Dab)$$

Here, V0 is a basic moving speed of the first cleaner 100a, $k$ is a proportional constant, Dmin is a follow-up distance, and Dab is a current separation distance between the plurality of cleaners 100a, 100b. Accordingly, the first cleaner 100a decelerates as a separation distance between the plurality of cleaners is larger than the follow-up distance, the first cleaner 100a accelerates when the separation distance between the plurality of cleaners approaches the follow-up distance. Accordingly, the second cleaner 100b following the first cleaner 100a may not suddenly accelerate or stop abruptly.

As described above, according to the present disclosure, the repulsive force may be applied to an obstacle and the attractive force and the repulsive force may be alternately applied between the plurality of cleaners 100a, 100b according to the separation distance, thereby allowing obstacle avoidance as well as flexible follow-up without any interruption.

Figure 7:
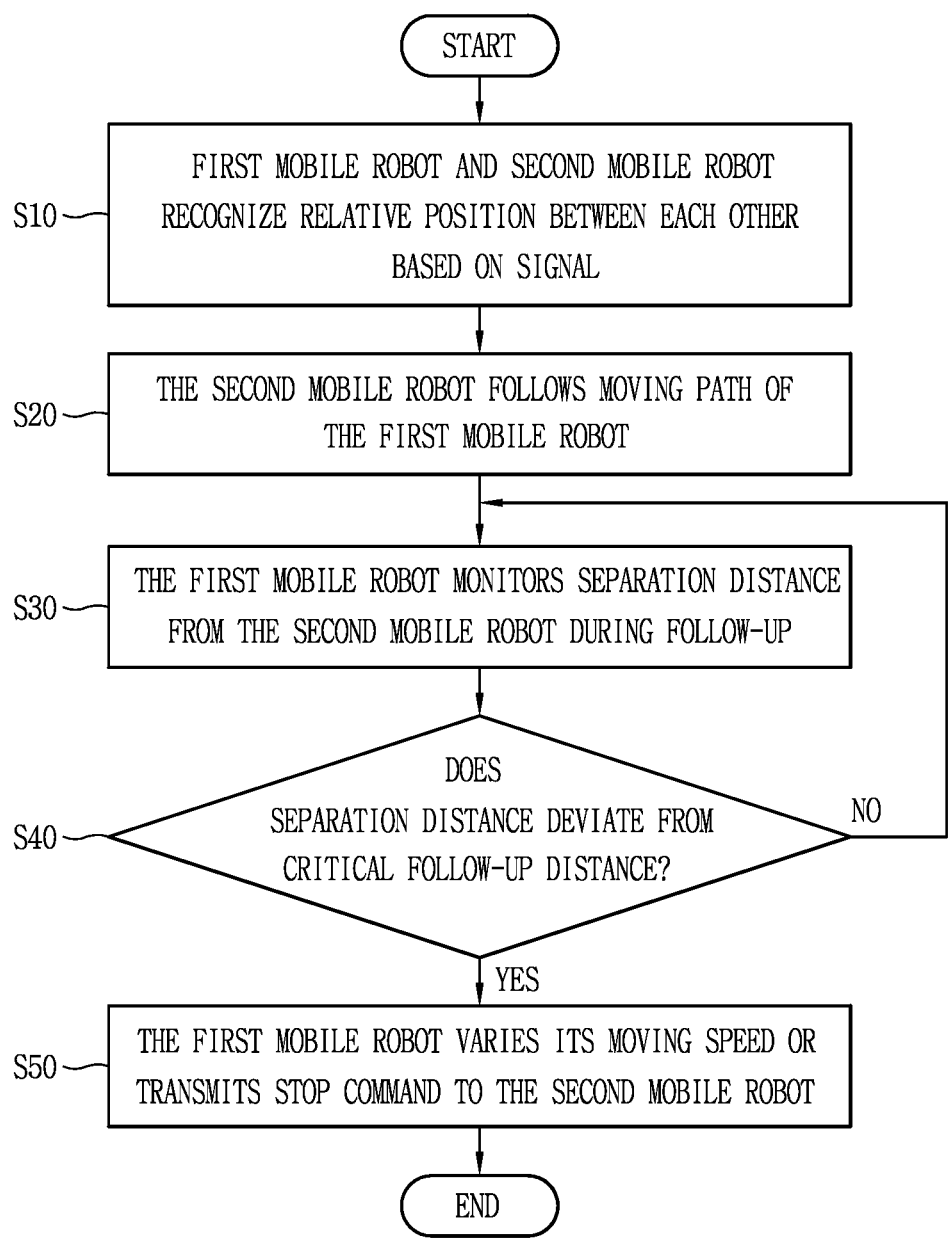

Hereinafter, a control method for flexible follow-up among a plurality of cleaners will be described in detail with reference to the flowchart of FIG. 7.

First, the communication unit of the first cleaner 100a and the communication unit of the second cleaner 100b are communicably connected to each other, and the process of recognizing a relative position between each other is started (S10).

Specifically, the first cleaner 100a and the second cleaner 100b transmit and receive signals to and from each other through an IR sensor, an ultrasonic sensor, a UWB sensor, or the like, disposed on a side outer circumferential surface of each cleaner or embedded in the main body to determine a direction and distance between each other. Since the foregoing sensor is a component for allowing the plurality of cleaners 100a, 100b to determine a relative position between each other, the sensor may be used in the same concept as the communication unit.

The first cleaner 100a and the second cleaner 100b respectively send and receive signals, and recognize a relative position between each other. Here, the signal may be any one of wireless communication signals using wireless communication technologies such as Zigbee™, Zwave™, and Bluetooth™, in addition to a ultra-wide band (UWB) signal, an infrared signal, a laser signal, and an ultrasound signal, for example.

The first cleaner 100a may transmit a first signal through the foregoing sensor and receive a second signal from the second cleaner 100b, thereby recognizing a relative position of the second cleaner 100b based on the first cleaner 100a. Furthermore, the second cleaner 100b may transmit a second signal through the foregoing sensor and receive a first signal received from the first cleaner 100a, thereby recognizing a relative position of the first cleaner 100a based on the second cleaner 100b.

Specifically, for example, one UWB sensor may be provided in each of the plurality of cleaners 100a, 100b, or a single UWB sensor may be provided in the first cleaner 100a and at least two UWB sensors in the second cleaner 100b.

The UWB module (or UWB sensor) may be included in the communication units 1100 of the first cleaner 100a and the second cleaner 100b. In view of the fact that the UWB modules are used to sense the relative positions of the first cleaner 100a and the second cleaner 100b, the UWB modules may be included in the sensing units 1400 of the first cleaner 100a and the second cleaner 100b.

For example, the first cleaner 100a may include a UWB module for transmitting ultra-wide band signals. The transmitting UWB module may be termed as a second type transmitting sensor or a "UWB tag."

Furthermore, the second cleaner 100b may include a receiving UWB module for receiving ultra-wide band signals output from a transmitting UWB module provided in the first cleaner 100a. The receiving UWB module may be named as a second type receiving sensor or a "UWB anchor."

UWB signals transmitted/received between the UWB modules may be smoothly transmitted and received within a specific space. Accordingly, even if an obstacle exists between the first cleaner 100a and the second cleaner 100b, if the first cleaner 100a and the second cleaner 100b exist within a specific space, they can transmit and receive the UWB signals.

The first cleaner and the second cleaner may measure the time of a signal transmitted and received between the UWB tag and the UWB anchor to determine a separation distance between the first cleaner 100a and the second cleaner 100b.

Specifically, for example, each of the plurality of cleaners 100a, 100b may be provided with one UWB sensor, or the first cleaner 100a may be provided with a single UWB sensor, and the second cleaner 100b following the first cleaner 100a may be provided with a single UWB sensor and at least one antenna or provided with at least two UWB sensors, so that the first cleaner 100a can measure distances to the second cleaner 100b at two different time points (t1, t2).

The UWB sensor of the first cleaner 100a and the UWB sensor of the second cleaner 100b radiate UWB signals to each other, and measure distances and relative speed using Time of Arrival (ToA), which is a time that the signals come back by being reflected from the robots. However, the present disclosure is not limited to this, and may recognize the relative positions of the plurality of cleaners 100a, 100b using a Time Difference of Arrival (TDoA) or Angle of Arrival (AoA) positioning technique.

Specifically, description will be given of a method of determining the relative positions of the first cleaner 100a and the second cleaner 100b using an AoA positioning technique. In order to use the AoA (Angle of Arrival) positioning technique, each of the first cleaner 100a and the second cleaner 100b should be provided with one receiver antenna or a plurality of receiver antennas. The first cleaner 100a and the second cleaner 100b may determine their relative positions using a difference of angles that the receiver antennas provided in the cleaners, respectively, receive signals. To this end, each of the first cleaner 100a and the second cleaner 100b must be able to sense an accurate signal direction coming from the receiver antenna array.

Since signals, for example, UWB signals, generated in the first cleaner 100a and the second cleaner 100b, respectively, are received only in specific directional antennas, they can determine (recognize) received angles of the signals. Under assumption that positions of the receiver antennas provided in the first cleaner 100a and the second cleaner 100b are known, the relative positions of the first cleaner 100a and the second cleaner 100b may be calculated based on signal receiving directions of the receiver antennas.

At this time, if one receiver antenna is installed, a 2D position may be calculated in a space of a predetermined range. On the other hand, if at least two receiver antennas are installed, a 3D position may be determined. In the latter case, a distance d between the receiver antennas is used for position calculation in order to accurately determine a signal receiving direction.

Furthermore, the present disclosure may be implemented to determine a relative position of the second cleaner 100b only through the first cleaner 100a or calculate and determine a relative position of the first cleaner 100a only through the second cleaner 100b. In this implementation example, the first cleaner 100a may transmit information related to the relative position to the second cleaner 100b or the second cleaner 100b may transmit information related to the relative position to the first cleaner 100a.

As described above, according to the present disclosure, since the plurality of cleaners 100a, 100b may determine relative positions to each other, and thus follow-up control may be carried out without any interruption by determining the relative positions to each other irrespective of the communication state of the server.

In addition, the first cleaner 100a and the second cleaner 100b may share the moving state information and the map information with each other through the respective communication units. Moving state information, map information, obstacle information, and the like may typically be transmitted from the first cleaner 100a to the second cleaner 100b according to the follow-up relationship between the plurality of cleaners 100a, 100b, but information sensed by the second cleaner 100b, for example, new obstacle information, may also be transmitted to the first cleaner 100a.

Next, the second cleaner 100b performs cleaning while following the moving path of the first cleaner 100a (S20).

Specifically, the first cleaner 100a initially cleans a designated cleaning area, and the second cleaner 100b performs the cleaning while following the moving path through which the first cleaner 100a has passed. At this time, the second cleaner 100b may also perform cleaning while following the moving speed of the first cleaner 100a and the cleaning mode on the relevant path.

Meanwhile, in one example, the actual moving path of the second cleaner 100b may not coincide with the moving path of the first cleaner 100a.

For example, when an obstacle that was not detected when the first cleaner 100a had passed is newly sensed at the time when the second cleaner 100b passes, the moving path of the second cleaner 100b may be slightly different from the moving path of the first cleaner 100a. At this time, the first cleaner 100a may be followed from the closest position at the time of avoiding the new obstacle.

While the second cleaner 100b follows the first cleaner 100a, the first cleaner 100a continuously monitors a separation distance from the second cleaner 100b (S30).

The controller of the first cleaner 100a continuously monitors a relative position between the first cleaner 100a and the second cleaner 100b based on signal values acquired through sensors such as UWB sensors, IR sensors, ultrasonic sensors, and the like, respectively provided therein, and determines whether a separation distance corresponding to the relative position is moving away or getting closer.

According to the monitoring, the controller of the first cleaner 100a may determine whether a separation distance from the second cleaner 100b deviates from the critical follow-up distance (S40). At this time, the controller of the first cleaner 100a may determine a current moving speed of the first cleaner 100a.

Here, the critical follow-up distance denotes a four-way distance within a circle range smaller than a range where a plurality of cleaners can determine relative positions among one another by a predetermined value.

The critical follow-up distance may include a "minimum follow-up distance" at which the plurality of cleaners 100a, 100b can be maximally close to each other and a "maximum follow-up distance" at which the plurality of cleaners 100a, 100b can be maximally far away from each other. Therefore, whether or not to deviate from the critical follow-up distance may denote that the separation distance between the plurality of cleaners 100a, 100b is less than the minimum follow-up distance or greater than the maximum follow-up distance.

When the separation distance approaches the minimum follow-up distance, a repulsive force is applied between the first cleaner 100a and the second cleaner 100b so as to be controlled to move away from each other. Furthermore, the separation distance approaches the maximum follow-up distance, an attractive force is applied between the first cleaner 100a and the second cleaner 100b so as to be controlled to move closer to each other.

As a result of the determination, when the distance does not deviate from the critical follow-up distance, the process returns to step S20. Accordingly, the second cleaner 100b continues cleaning while following the first cleaner 100a.

As a result of the determination, when the distance deviates from or is expected to deviate from the critical follow-up distance, the controller of the first cleaner 100a varies the moving speed of the traveling unit of the first cleaner 100a or transmits a stop command to the second cleaner 100b (S50).

Figure 8A:
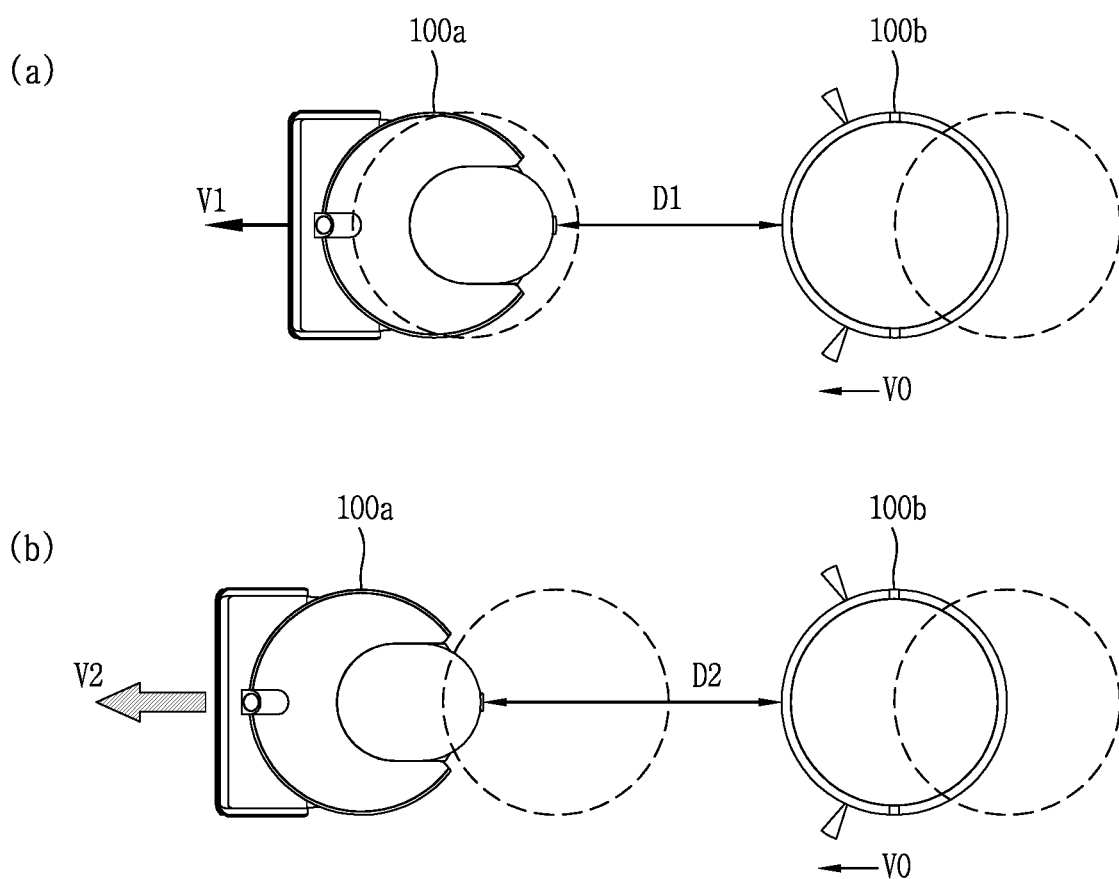
Figure 8B:
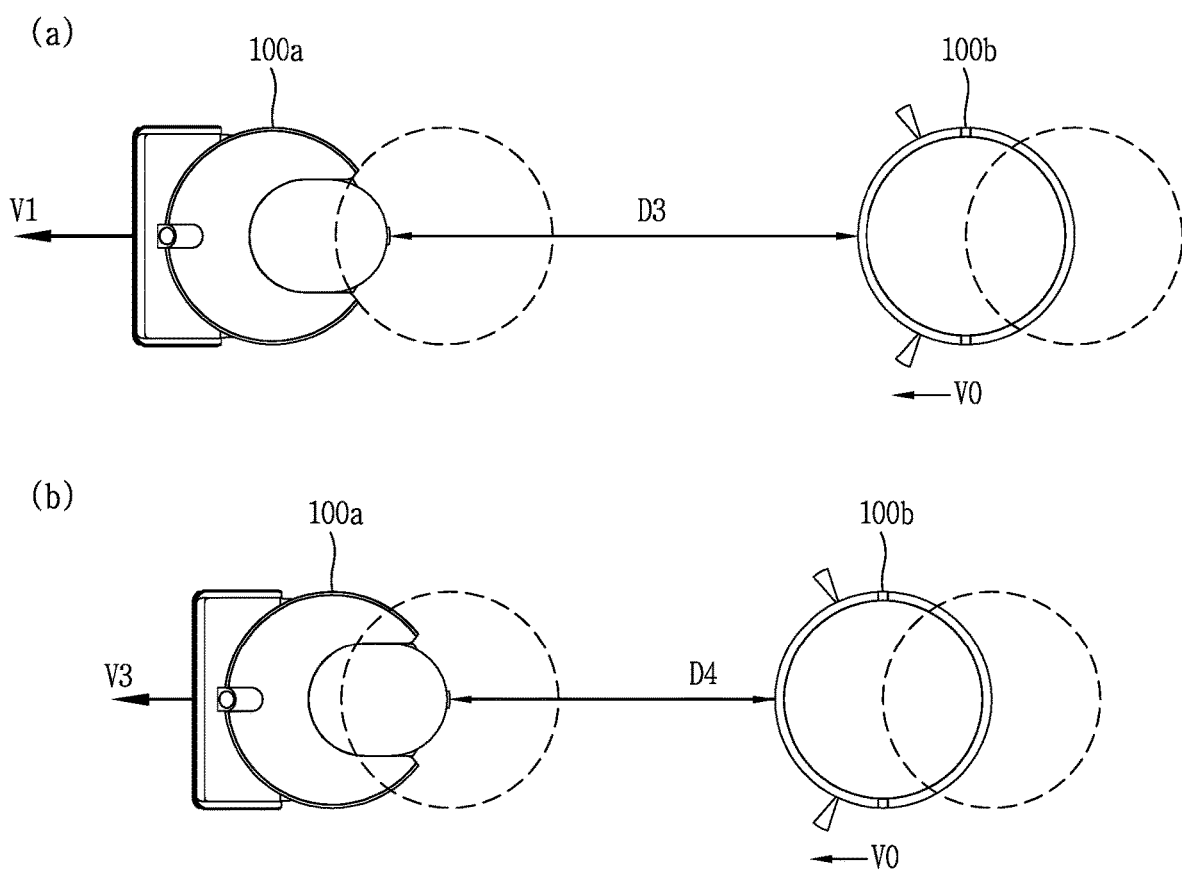
Figure 8C:
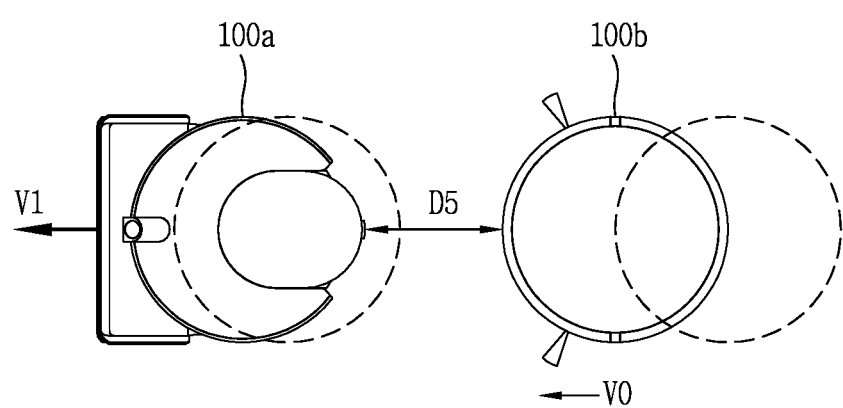
Figure 8C:
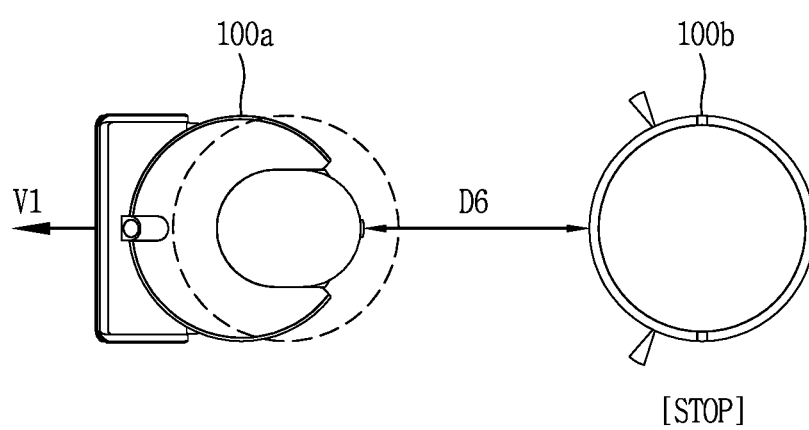

FIGS. 8A through 8C show various examples in which the first cleaner 100a controls the moving speed of itself or the second cleaner 100b based on the critical follow-up distance.

First, (a) of FIG. 8A shows a case where a separation distance (D1) between the first cleaner 100a and the second cleaner 100b does not deviate from the critical follow-up distance (e.g., minimum critical follow-up distance), but is determined to be less than the critical follow-up distance on the basis of the current moving speeds (V1, V0) of the second cleaner 100a and the second cleaner 100b.

At this time, as shown in (b) of FIG. 8A, the first cleaner 100a adds a value (plus value) obtained by subtracting the expected separation distance from the critical follow-up distance to the present moving speed (V1) to change the moving speed of the first vehicle 100a. Accordingly, the first cleaner 100a moves at the accelerated moving speed (V2), and thus the separation distance (D2) from the second cleaner 100b increases.

Next, (a) of FIG. 8B shows a case where a separation distance (D3) between the first cleaner 100a and the second cleaner 100b does not deviate from the critical follow-up distance (e.g., maximum critical follow-up distance), but is determined to be larger than the critical follow-up distance on the basis of the current moving speeds (V1, V0) of the second cleaner 100a and the second cleaner 100b.

At this time, as shown in (b) of FIG. 8B, the first cleaner 100a adds a value (minus value) obtained by subtracting the expected separation distance from the critical follow-up distance to the present moving speed (V1) to change the moving speed of the first vehicle 100a. Accordingly, the first cleaner 100a moves at the decelerated moving speed (V3), and thus the separation distance (D4) from the second cleaner 100b decreases.

Here, the decelerated moving speed (V3) may include "0". For example, when the moving speed of the second cleaner 100b is further reduced, or when the separation distance (D3) between the first cleaner 100a and the second cleaner 100b slightly deviates from the critical follow-up distance, the first cleaner 100a may be controlled to stop.

Next, (a) of FIG. 8C shows a case where it is the same as FIG. 8A that a separation distance (D5) between the first cleaner 100a and the second cleaner 100b is determined to be less than the critical follow-up distance (e.g., maximum critical follow-up distance), but the first cleaner 100a is unable to move at an accelerated speed according to the surrounding situation.

At this time, as shown in (b) of FIG. 8C, the first cleaner 100a may transmit a stop command to the second cleaner 100b while maintaining the moving speed of itself. After a predetermined period of time elapses, when separation distance (D6) between the first cleaner 100a and the second cleaner 100b increases, a drive command may be transmitted to the second cleaner 100b so as to be controlled to continue follow-up.

On the other hand, when the moving path of the second cleaner 100b is changed from the moving path of the first cleaner 100a depending on the surrounding situation, in case where the changed moving path is further away from the separation distance from the first cleaner 100a, the first cleaner 100a may receive such state information to slow down the moving speed of the first cleaner 100a or stop the moving of the first cleaner 100a for a predetermined period of time so as not to interrupt follow-up.

In the present disclosure, the first cleaner 100a changes the moving direction several times according to a shape of cleaning space, a cleaning moving mode, sensing of an obstacle, a geographic feature of the floor while moving to clean a designated cleaning space. Accordingly, the first cleaner 100a may leave a complex trajectory or can form a complex moving path.

In this case, when the second cleaner 100b follows the moving path of the first cleaner 100a as it is, it may cause an error operation due to inability to enter or a delay in the entire cleaning time.

This may occur especially when the types and specifications of the first cleaner 100a and the second cleaner 100b are different.

For example, when it is a narrow or low region to allow the first cleaner 100a to pass therethrough but disallow the second cleaner 100b to pass therethrough, or when it is a specific floor state (e.g., a carpet or the like is laid), the second cleaner 100b is unable to follow the trajectory of the first cleaner 100a as it is.

Alternatively, for example, when the first cleaner 100a takes a long time to pass through due to the complexity of the entered region, a similar period of time may be required for the second cleaner 100b to delay the entire cleaning time, thereby reducing cleaning efficiency.

Accordingly, a method of allowing the movement trajectory of the first cleaner 100a, which is the leading cleaner, to sense "satisfaction of a specified condition" while the second cleaner 100b follows the first cleaner 100a to perform cleaning so as to control the second cleaner 100b to move by omitting part of the movement trajectory of the first cleaner 100a or move to another moving path temporarily is implemented.

Here, the "satisfaction of a specified condition" denotes a state in which the second cleaner 100b is determined not to follow the next trajectory of the first cleaner 100a at a current position. Accordingly, it may include a case where the second cleaner 100b is actually unable to follow the next trajectory as well as a case where it is determined that the second cleaner 100b does not follow in consideration of time delay although the second cleaner 100b is actually able to follow the first cleaner 100a. Furthermore, it may include a case where the second cleaner 100b is unable to follow the first cleaner 100a regardless of the movement trajectory of the first cleaner 100a, such as a case where the first cleaner 100a is a dry (or suction) cleaner, the second cleaner 100b is a wet (or mop) cleaner, and the first cleaner 100a is cleaning on a carpet.

In addition, the "satisfaction of a specified condition" may be determined by at least one of information on an obstacle sensed by the sensor of the first cleaner 100a (and/or the sensor of the second cleaner 100b), identification information of the second cleaner 100b, information related to the operation state of the second cleaner 100b, and floor state information at a relative position of the second cleaner 100b.

Here, the information on an obstacle may include information on a size of the obstacle, a number of obstacles, and a separation distance between the plurality of obstacles. Furthermore, the obstacle may include a fixed obstacle such as a wall, a furniture, a fixture, or the like, protruded from the floor of the cleaning area to obstruct moving of the cleaner, and a moving obstacle.

In addition, the identification information of the second cleaner 100b may include a type of the second cleaner 100b, a size of the product, a height of the product, product information, and the like, and the identification information may be compared with respect to the identification information of the first cleaner 100a. Moreover, the identification information of the second cleaner 100b may be received from the second cleaner 100b at the time of follow-up registration of the second cleaner 100b for the first cleaner 100a.

Besides, the information related to the operation state of the second cleaner 100b denotes moving related information such as a moving mode, a moving direction, a moving speed, and a moving stop of the second cleaner 100b. This can be acquired by analyzing signals sent and received through a sensor provided in the first cleaner 100a and a sensor provided in the second cleaner 100b.

Furthermore, the floor state information at a relative position of the second cleaner 100b may be obtained using the above-described relative position recognizing method and information acquired through the 3D sensor/camera sensor of the first cleaner 100a while passing through the relevant position. For example, when the first cleaner 100a is a dry (or suction) cleaner and enters on a carpet to perform cleaning, if the following second cleaner 100b is a wet (or mop) cleaner, then it may be determined that the second cleaner 100b satisfies the specified condition based on the floor state information.

Hereinafter, a control operation for allowing the second cleaner to roughly follow the trajectory of the first cleaner when the second cleaner following the first cleaner satisfies a specified condition will be described in detail with reference to FIGS. 9 and 10.

Figure 9:
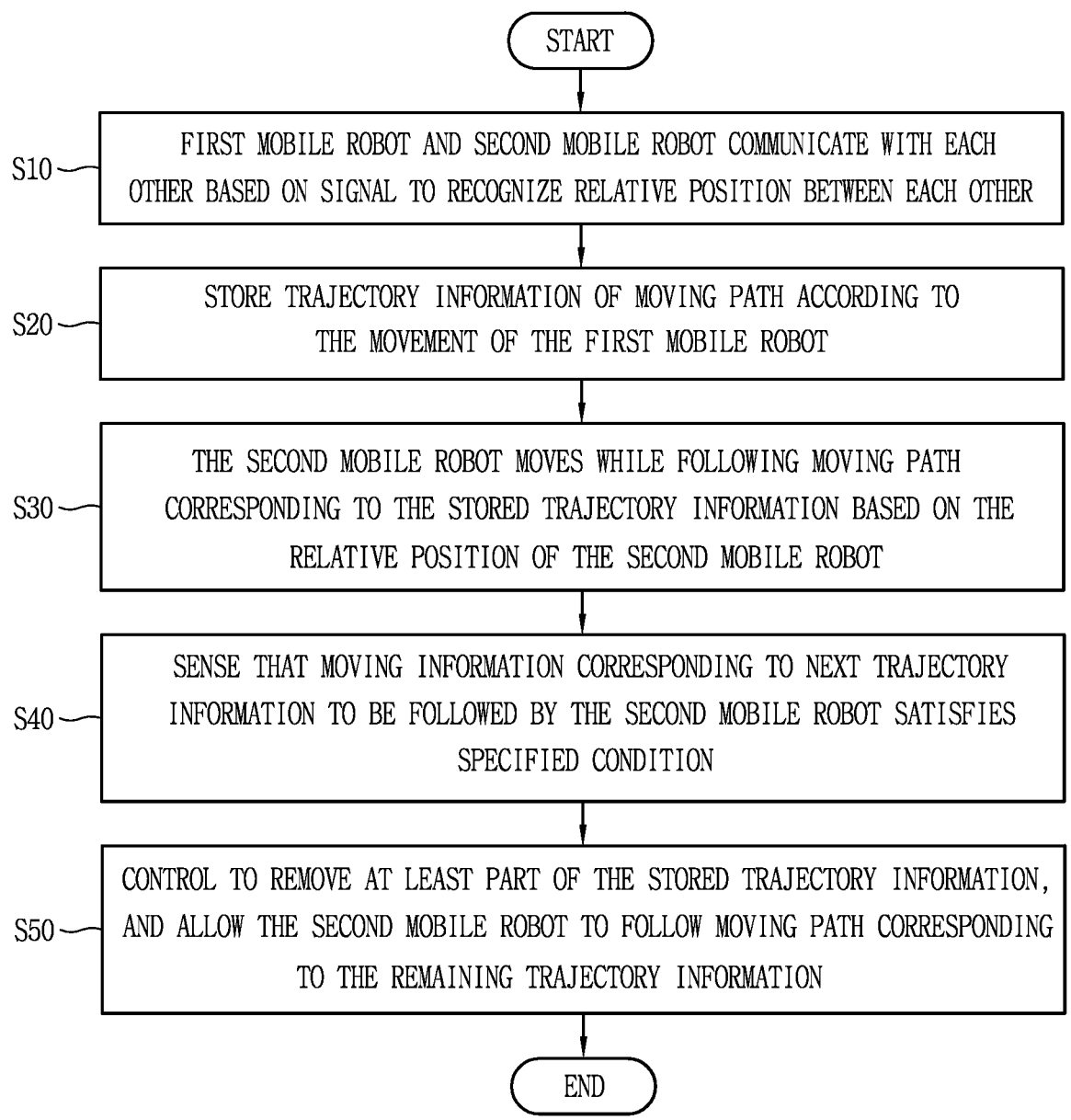
FIGS. 9 and 10 are exemplary flowcharts and conceptual views for explaining that a second cleaner following a first cleaner performs a sector moving mode based on obstacle information, according to an embodiment of the present disclosure.

Referring to FIG. 9, the process of allowing the first cleaner 100a and the second cleaner 100b to communicate with each other based on a signal (e.g., a UWB signal) so as to obtain a relative position between each other is started (S10).

More specifically, direct communication between the first cleaner 100a and the second cleaner 100b is carried out without server communication by transmitting and receiving signals (e.g., UWB signals) to/from each other using sensors provided in the first cleaner 100a and sensors provided in the second cleaner 100b.

The first cleaner 100a may recognize a relative position of the second cleaner 100b based on a first signal transmitted and received through a sensor (e.g., a UWB sensor) provided in the first cleaner 100a and a second signal transmitted and received through a sensor (e.g., a UWB sensor) provided in the second cleaner 100b. Since the types of sensors and signals for obtaining a relative position between each other have been described above, and detailed description thereof will be omitted herein.

Then, the first cleaner 100a stores the trajectory information of the moving path according to the movement of the main body in the memory (S20).

Here, the trajectory denotes a curve in space in which points where the first cleaner 100a sequentially has passed while moving to perform cleaning. Furthermore, the trajectory information may include not only information on a curve forming the trajectory but also information on the number, order, and interval of the points forming the curve.

Therefore, the trajectory information of the moving path may include both information on sequential points forming the moving path of the first cleaner 100a and information on a curve, including all information such as the moving order, moving direction, moving speed, in-place rotation, and the like of the moving path of the first cleaner 100a, for example.

In another example, the second cleaner 100b may store the trajectory information of the moving path according to the movement of the first cleaner 100a, based on the relative position of the first cleaner 100a.

Next, based on the relative position of the second cleaner 100b, the second cleaner 100b moves while following a moving path corresponding to the stored trajectory information of the first cleaner 100a (S30).

To this end, the first cleaner 100a may control the second cleaner 100b such that the second cleaner 100b performs cleaning while following the trajectory information of the first cleaner 100a.

For example, the first cleaner 100a may calculate a separation distance from the second cleaner 100b based on the time-of-flight (TOF) of signals transmitted and received to and from the second cleaner 100b. At this time, the first cleaner 100a determines that the separation distance from the second cleaner 100b is smaller as the TOF decreases, and the first cleaner 100a determines that the separation distance from the second cleaner 100b is larger as the TOF increases. In addition, the first cleaner 100a may be regarded as the center of a circle, and a change in the separation distance may be determined using a distance of the second cleaner 100b existing on the circle at two different time points.

Alternatively, in another example, the first cleaner 100a and the second cleaner 100b may determine a relative position between each other using a difference in signal receiving angles received at receiver antennas provided therein, respectively, to obtain a change in the separation distance.

In one example, the moving information of the first cleaner 100a along with the calculated separation distance may be transmitted to the second cleaner 100b. Furthermore, the second cleaner 100b may transmit its own state information to the first cleaner 100a.

Here, the moving information may include all information on obstacle information, map information, a moving mode, a moving path, floor state information, and a moving speed. Accordingly, the second cleaner 100b may perform moving along the moving path of the first cleaner 100a based on the state information transmitted from the first cleaner 100a.

On the other hand, while the second cleaner 100b follows the first cleaner 100a, in order not to deviate from follow-up, an attractive force (Fm) and a repulsive force (Fo) according to the concept of virtual impedance control may be alternately applied on the basis of the determined follow-up distance.

Specifically, the first cleaner 100a may compare the calculated separation distance with a specified follow-up distance, and alternately apply attractive and repulsive forces according to the concept of virtual impedance control based on the comparison result, thereby variably controlling the moving speeds of the cleaner 100a and the second cleaner 100b. Accordingly, the second cleaner 100b may naturally follow the moving path of the first cleaner 100a seamlessly without any interruption.

For example, when the calculated separation distance is larger than the follow-up distance, the controller of the first cleaner 100a may apply an attractive force to decelerate the moving speed of the first cleaner 100a, accelerate the moving speed of the second cleaner 100b, or perform both the operations, thereby decreasing the separation distance. Furthermore, when the calculated separation distance is too small compared to the follow-up distance, the controller of the first cleaner 100a may apply a repulsive force to accelerate the moving speed of the first cleaner 100a, decelerate the moving speed of the second cleaner 100b, or perform both the operations, thereby increasing the separation distance.

Furthermore, in the present disclosure, receiving sensors may be placed on rear and front sides of the first cleaner 100a to allow the controller of the first cleaner 100a to recognize the receiving direction of a signal (e.g., a UWB signal) received from the second cleaner 100b. To this end, a UWB sensor may be provided at a rear side of the first cleaner 100a, and a UWB sensor or a plurality of optical sensors may be spaced apart from a front side of the first cleaner 100a. In addition, the second cleaner 100b may be provided with one or more UWB sensors and a plurality of receiving antennas.

The first cleaner 100a may recognize the receiving direction of a signal received from the second cleaner 100b to determine whether the second cleaner 100b is located on a rear side of the first cleaner 100a. Accordingly, the first cleaner 100a may determine whether the order of the first cleaner 100a and the second cleaner 100b is reversed.

On the other hand, the second cleaner 100b may move while following the trajectory information of the first cleaner 100a stored in its own memory. Next, in step S40, it is sensed that the moving path of the next trajectory information among the trajectory information corresponding to the relative position of the second cleaner 100b and the stored movement of the first cleaner 100a satisfies a specified condition (S40).

The "satisfaction of a specified condition" may be determined by at least one of information on an obstacle sensed by the sensor of the first cleaner 100a (and/or the second cleaner 100b), identification information of the second cleaner 100b, information related to the operation state of the second cleaner 100b, and floor state information at a relative position of the second cleaner 100b.

For example, when there exist a plurality of obstacles near the trajectory to be followed next, if the trajectory to be followed next is on a carpet and the second cleaner 100b is a wet (or mop) cleaner, it may be sensed that the second cleaner 100b satisfies a specified condition.

When a state satisfying such a specified condition is detected, the first cleaner 100a or the second cleaner 100b removes part of the trajectory information of the first cleaner 100a stored in the memory, and the second cleaner 100b is controlled to follow a moving path corresponding to the remaining trajectory information (S50).

For example, it is assumed that when points in a trajectory forming a moving path in the order of a first point, a second point, a third point, and a fourth point are stored in the memory, a state satisfying the specified condition is detected at the first point.

In this case, the second cleaner 100b as a following cleaner may be controlled to remove part (e.g., second point) of the second through fourth points including the first point and follow a moving path formed by connecting the remaining points, for example, the third point and the fourth point. To this end, the second cleaner 100b may move to the third point directly from the current position.

In one embodiment, trajectory information followed by the second cleaner in the stored trajectory information is deleted from the memory. For example, when the second cleaner has passed through all of the first to third points or the second cleaner has moved to the third point directly from the first point, the trajectory information of the first point, the second point, and the third point is deleted from the memory. As a result, the memory shortage problem does not occur.

Since the trajectory information of the first cleaner is controlled according to a first-stored first-deleted rule, a queue buffer in a first-in first-out (FIFO) scheme may also be used as a memory.

Furthermore, in one embodiment, when it is sensed that the second cleaner satisfies a specified condition for first trajectory information among the stored trajectory information, the first cleaner may transmit a control command for moving the second cleaner to a position corresponding to second trajectory information stored subsequent to the first trajectory information. At this time, at least one intermediate trajectory information may be included between the first trajectory information and the second trajectory information.

Accordingly, here, it may be said that the second cleaner roughly follows the first cleaner by omitting the first trajectory information and the intermediate trajectory information from the moving path of the first cleaner. Furthermore, it may also be said that the second cleaner follows the moving path of the first cleaner from a point corresponding to the second trajectory information.

In addition, when the second cleaner moves to a point corresponding to the second trajectory information, the first cleaner or the second cleaner deletes the first trajectory information and the intermediate trajectory information on which the second cleaner has not moved from the memory. Then, when the second cleaner passes the second trajectory information, the second trajectory information is deleted from the memory. At the same time, new trajectory information corresponding to the movement of the first cleaner is stored in the memory.

Meanwhile, in the present disclosure, the second cleaner may follow the moving path of the first cleaner in a specified sector unit.

Here, the sector unit denotes a virtual area divided by a predetermined length or a predetermined size of a moving path to be followed so that the second cleaner can efficiently follow the moving path. The entire moving path of the first cleaner may be divided into a plurality of sectors. Furthermore, it may be said that a partial moving path corresponding to a plurality of trajectory information is included in one sector.

For an example, when the second cleaner follows a moving path corresponding to the plurality of trajectory information within a first sector of the first cleaner, the second cleaner may be controlled to enter into the second sector, which is the next sector, and follow a moving path corresponding to the plurality of trajectory information within the second sector. At this time, when it is determined that arbitrary trajectory information (including initial trajectory information) within the second sector is in a follow-up disable state, the second cleaner may move to a position of the initial trajectory information of a third sector, which is the next sector of the second sector.

For another example, the second cleaner may normally follow the moving path of the first cleaner as it is, and then perform a "sector moving mode" for performing the first cleaner in the foregoing sect unit when it is sensed that the foregoing specified condition is satisfied with respect to the arbitrary trajectory information.

When the specified condition is not satisfied for a predetermined period of time or while passing a predetermined sector subsequent to entering the sector moving mode, the second cleaner may be controlled to terminate the "sector moving mode" and follow the moving path of the first cleaner again as it is.

For another example, the second cleaner 100b may enter the sector moving mode based on obstacle information received from the first cleaner 100a or obstacle information sensed through the obstacle sensor of the sensing unit 1400 of the second cleaner 100b.

Here, the obstacle information may include information on a position, size, width, height, entry possibility of an obstacle, and a number and separation distance in the case of a plurality of obstacles. Furthermore, the obstacle may include a fixed obstacle such as a wall, a furniture, a fixture, or the like, protruded from the floor of the cleaning area to obstruct moving of the cleaner, and a moving obstacle. When it is determined that a predetermined number or more of obstacles exist in a moving direction corresponding to the trajectory information of the first cleaner 100a based on obstacle information received from the first cleaner 100a, the second cleaner 100b may enter the sector moving mode.

For example, when there exist three or more obstacles in the moving direction corresponding to the trajectory information of the first cleaner 100a, it may be set to enter the sector moving mode. On the other hand, for an example, another condition such as a size and height of an obstacle, and a number and separation distance of a plurality of obstacles, and the like may be an entry condition to the sector moving mode.

In one example, such an entry condition may be varied through a user input.

In addition, in one example, when no obstacle is sensed while a predetermined period of time elapses subsequent to the execution of the sector moving mode, the sector moving mode may be canceled so as to follow the trajectory of the leading cleaner in accordance with a typical follow-up relationship.

Alternatively, in one example, when there is no obstacle information received from the first cleaner 100a or when the first cleaner 100a is easily avoidable but the second cleaner 100b is not avoidable, even when it is determined that a specified condition is satisfied based on obstacle information sensed by a sensor provided in the second cleaner 100b, it may be possible to enter the sector moving mode.

For example, since the present disclosure is allowed to apply a follow-up relationship even between different types of cleaners, even with the same obstacle, there may be a case where the first cleaner 100a can enter, but the second cleaner 100b cannot enter or pass through the obstacle.

Since a follow-up relationship between the first cleaner 100a and the second cleaner 100b is maintained even in the sector moving mode, the second cleaner may be controlled to perform moving by omitting only a partial trajectory complicating the moving path without deviating greatly from the trajectory of the first cleaner.

To this end, when entering the sector moving mode, the first cleaner 100a may set a sector including a plurality of trajectory information of the first cleaner 100a on the basis of the current position of the second cleaner 100b. At this time, the size of the sector may be set so that the length of one side does not exceed the follow-up distance between the first cleaner 100a and the second cleaner 100b.

In addition, in one example, the size of the sector may be determined differently depending on the moving speed corresponding to the trajectory information of the first cleaner 100a. For example, when a distance between points corresponding to the trajectory information of the first cleaner 100a is small, that is, in a section where the moving speed of the first cleaner 100a is low, the size of the sector may be set smaller than the reference size.

In addition, when a distance between points corresponding to the trajectory information of the first cleaner 100a is large, that is, in a section where the moving speed of the first cleaner 100a is high, the size of the sector may be set larger than the reference size.

In addition, the sectors may be moved together or set to a new position according to the movement of the second cleaner 100b.

When it is determined that the first cleaner 100a satisfies a specified condition based on the identification information of the second cleaner 100b and the obstacle information described above, part of the trajectory information to be followed may be omitted.

Specifically, when it is determined that a moving path corresponding to the trajectory information in the set sector is heading toward a direction in which a plurality of obstacles are present, the first cleaner 100a may omit part or all of the trajectory information in the relevant sector.

Then, the second cleaner 100b may be controlled to move out of the relevant sector by another moving path and follow the trajectory information in the next sector of the first cleaner.

However, even at this time, the follow-up relationship between the second cleaner 100b and the first cleaner 100a is maintained, and thus the target moving direction of the second cleaner 100b is preferably controlled not to deviate significantly from the recent movement trajectory of the first cleaner 100a.

On the other hand, even though there are a plurality of obstacles in the set sector, when it is determined that the trajectory information in the relevant sector is heading toward a direction different from the direction in which a plurality of obstacles are present, the moving of the second cleaner 100b is controlled for the second cleaner 100b to sequentially follow points of every moving moment within the sector.

In addition, according to the present disclosure, the second cleaner may detect the follow-up disable state based on the obstacle information and the trajectory information of the first cleaner, and the state information of the second cleaner itself, and accordingly determine whether to follow a plurality of trajectory information within the sector as they are or omit part or all of them, so as to control moving by itself.

Figure 10:
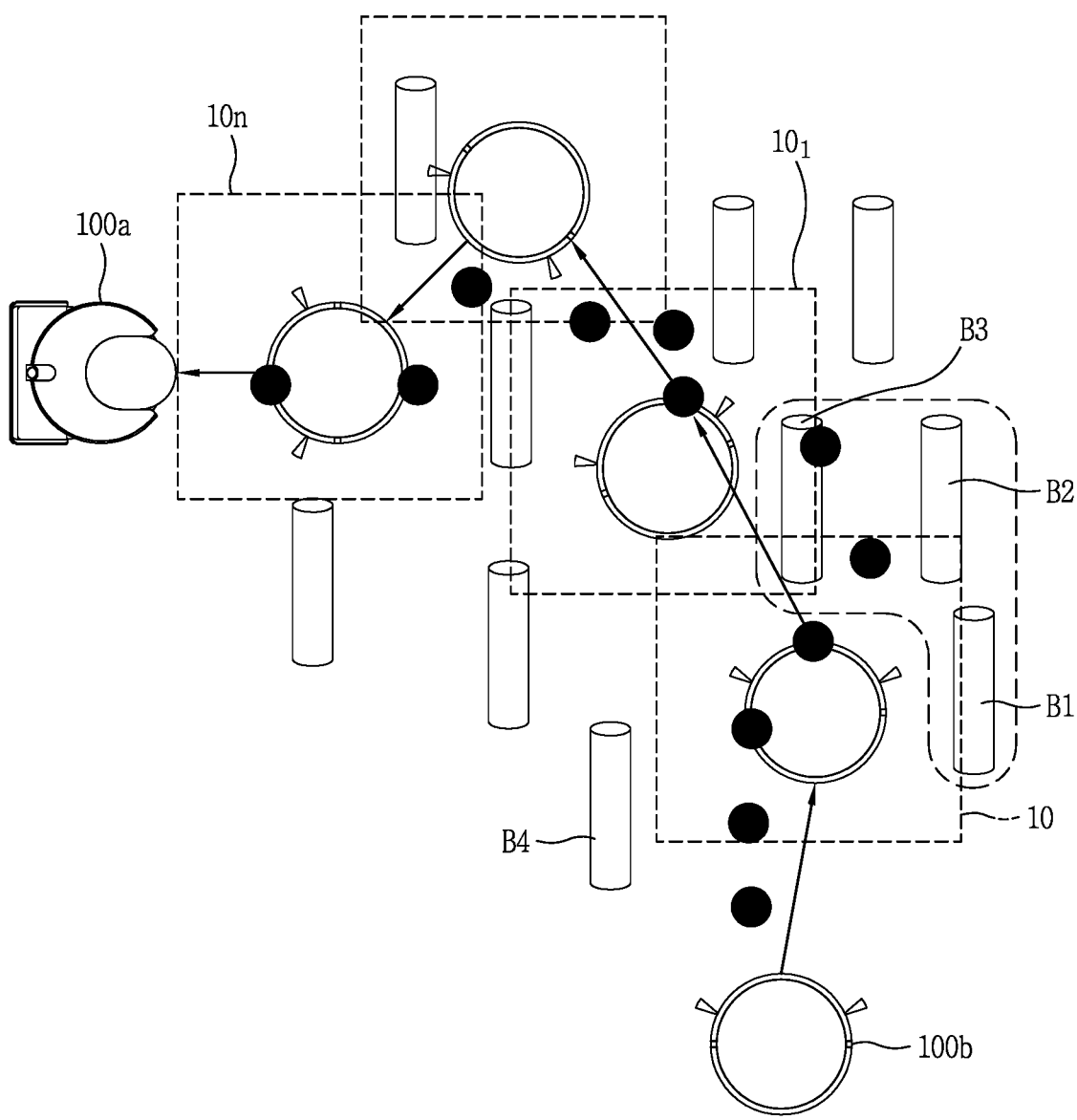

Hereinafter, FIG. 10 shows a specific example of the sector moving mode described above.

In FIG. 10, when the first cleaner 100a as the leading cleaner moves in a cleaning area where the plurality of obstacles (B1, B2, B3, B4) are present, the second cleaner 100b, which is the follower cleaner may receive such obstacle information from the first cleaner 100a.

Furthermore, the first cleaner 100a (or the second cleaner 100b) may sense that a specified condition is satisfied based on the relative position and identification information of the second cleaner 100b, and the obstacle information to allow the second cleaner 100b to be moved in a sector moving mode. Accordingly, the follow-up of the second cleaner 100b is controlled in units of the set sectors 10, $10_1$, $10_2$, 10n.

In the first sector 10, the trajectory of the first cleaner 100a is heading toward a position where the three obstacles (B1, B2, B3) are present, and a point corresponding to the following trajectory is passing between a plurality of obstacles (B2, B3).

In one example, the second cleaner 100b may determine whether the second cleaner itself is able to enter based on the obstacle information and the moving information (i.e., moving by passing between the plurality of obstacles (B2, B3)) received from the first cleaner 100a.

This may vary depending on the type, operation state, specification and the like of the second cleaner 100b. Furthermore, in an example, the second cleaner 100b itself may directly calculate whether or not actual entry is allowed in consideration of information sensed through sensors provided in the second cleaner 100b, the type, operation state and specification of the second cleaner 100b, and a separation distance between obstacles.

However, in order to prevent a time delay due to an additional operation, when a predetermined number or more of obstacles are sensed within a sector, and the trajectory of the leading cleaner is heading toward the obstacles while a sector moving mode is carried out as described above, it is determined as "satisfaction of a specified condition" regardless of whether or not actual entry is allowed.

In FIG. 10, when it is determined as "satisfaction of a specified condition," the second cleaner 100b does not follow the movement trajectory within the sector 10, in other words, removes a plurality of trajectory information within the sector unit 10 to move out of the sector 10.

At this time, the moving of the second cleaner 100b proceeds while following the trajectory of the first cleaner 100a in the next sector, that is, the second sector $10_1$. In other words, the second cleaner 100b performs cleaning while leaving the sector 10 to follow the next trajectory information of the first cleaner 100a.

At this time, the setting of the second sector $10_1$ including the next trajectory information of the first cleaner 100a may be determined based on the current moving direction of the second cleaner 100b and the position of the next trajectory information of the first cleaner 100a among the remaining directions excluding the moving direction at the time of determination as satisfaction of a specified condition in the previous sector, that is, the first sector 10.

The sectors 10, $10_1$, . . . , $10_n$ may be set such that part of the previous sector and part of the next sector overlap with each other so that there is no interruption in follow-up.

In one example, the second cleaner 100b may determine a path connected from the current position of the second cleaner 100b to the position of the initial trajectory information of the first cleaner 100a detected subsequent to the first sector 10 through the shortest distance as the next moving path of the second cleaner 100b. This may also be referred to as a moving path for entering the second sector $10_1$.

When it is determined that a complex region, a complex sector, and the like are finished subsequent to performing a sector moving mode up to an n-th sector 10n in this manner, the second cleaner 100b may finish the sector moving mode, and then perform cleaning while following points of every moving moment of the first cleaner 100a again.

As described above, according to an embodiment of the present disclosure, the second cleaner may be controlled to normally perform cleaning while sequentially following the movement trajectory of the first cleaner, and perform cleaning while roughly following the first cleaner in a predetermined sized sector unit in a situation where a complex region or a complex sector is present, thereby solving a time delay problem caused in a complicated situation while maintaining cleaning efficiency according to follow-up.

In addition, in one embodiment, even though the following mobile robot does not follow the moving path of the leading mobile robot as it is, when it is sufficient to perform its function, for example, when the first mobile robot is a robot cleaner, and the second mobile robot is a mobile air conditioner, the second mobile robot may move while roughly following the trajectory of the first mobile robot in a sector unit from the beginning without determining whether or not the next trajectory to be followed by the second mobile robot satisfies the specified condition described above. Hereinafter, a method of determining the moving path of the second cleaner in the case where part or all of the trajectory information of the first cleaner within the sector is omitted will be described in detail with reference to FIGS. 11A, 11B, and 11C.

When it is sensed that a plurality of obstacles are close to the position of the next trajectory information to follow at the current position of the second cleaner, the controller of the first cleaner may control the moving of the second cleaner to follow the position of the first cleaner on another moving path instead of the moving path including the next trajectory information.

To this end, the controller of the first cleaner controls the moving of the second cleaner in a "sector moving mode" so that the second cleaner follows the moving path corresponding to the trajectory information stored in the first cleaner or the second cleaner in a specified sector unit. At this time, a moving path corresponding to a plurality of trajectory information may be included in the sector.

Figure 11A:
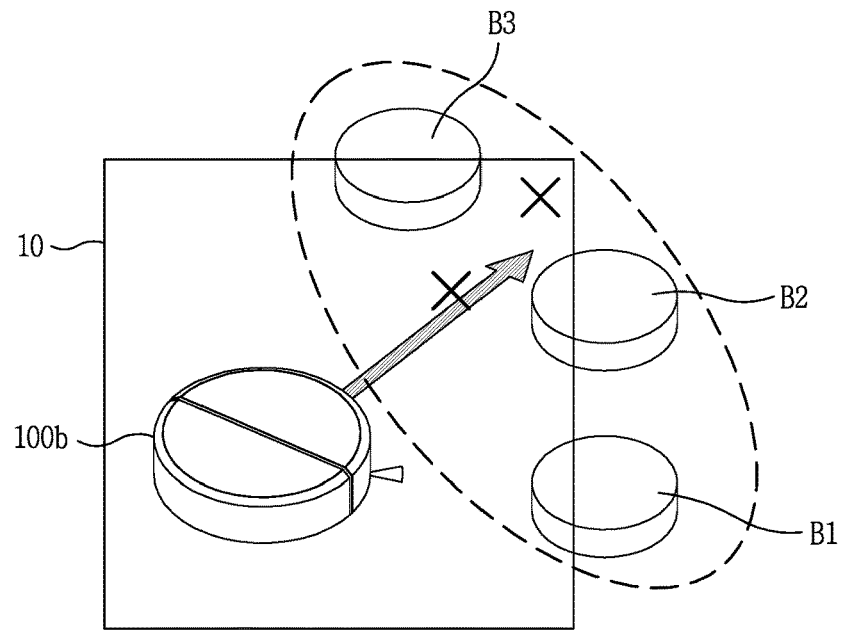
FIGS. 11A, 11B, and 11C are exemplary conceptual views for explaining that the second cleaner moves while removing a movement trajectory within a sector unit, according to an embodiment of the present disclosure.

For an example, FIG. 11A shows a case where in the sector moving mode, the trajectory of the first cleaner 100a written in the sector 10 is determined to be heading toward the plurality of obstacles (B1, B2, B3), and completely removed so as not to follow it. In other words, all trajectories within the sector 10 have been removed.

Figure 11B:
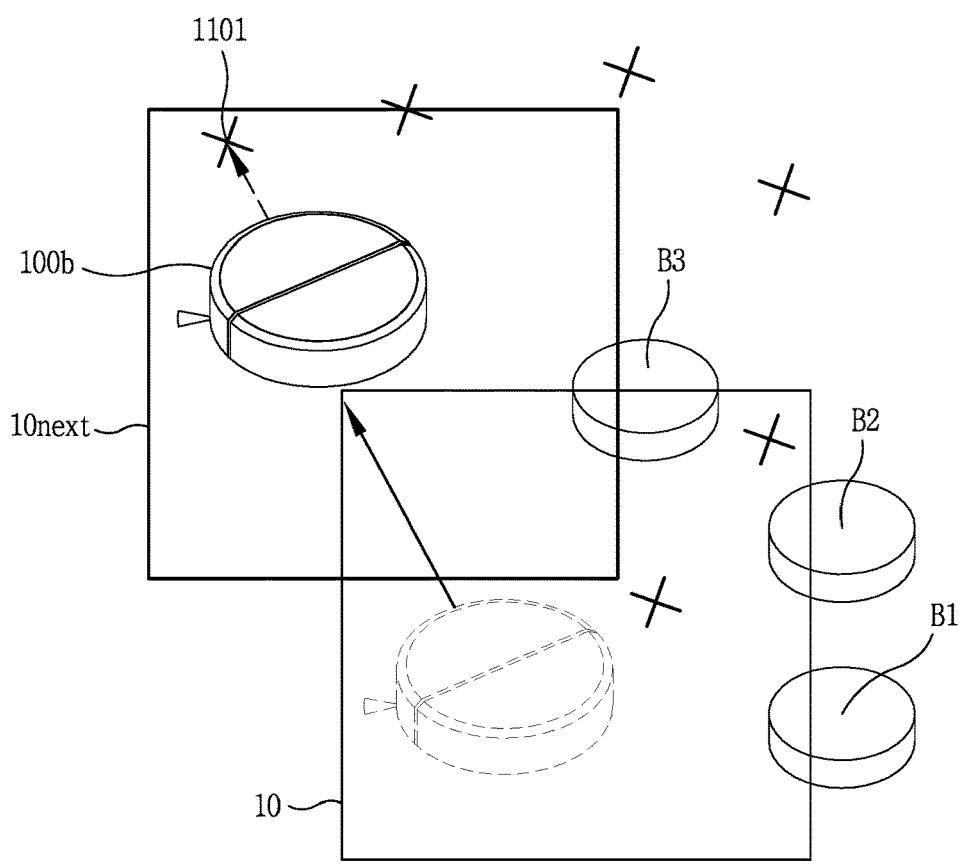

In this case, a next sector 10 next is set based on the moving direction of the second cleaner 100b in the sector 10 and the position of the next trajectory information of the first cleaner 100a, as illustrated in FIG. 11B. At this time, in order not to miss follow-up, at least part of the previous sector 10 and the next sector 10 next may overlap with each other.

Next, the second cleaner 100b must leave the current sector 10 to enter the next sector 10 next. For example, in FIG. 11B, the moving path of the second cleaner 100b for leaving the sector 10 may be the shortest path in which the position of the first cleaner 100a, that is, specific trajectory information included in the next sector 10 next, is a target point.

Here, the specific trajectory information may be a first trajectory of the first cleaner 100a displayed (or detected) in the next sector 10 next, the last trajectory, or any other trajectory.

When only one point 1101 is detected as shown in FIG. 11B, the second cleaner 100b may move while following it as a target point. At this time, the trajectories of the first cleaner 100a preceding the target point but not included in the next sector 10 next are excluded from the moving path of the second cleaner 100*b*. Therefore, the corresponding trajectory information is deleted from the memory of the first cleaner 100*a*.

On the other hand, when there are a plurality of points corresponding to the trajectory displayed (or detected) in the next sector 10 next, the follow-up path of the second cleaner 100*b* varies depending on which point is selected as the target point.

In one example, a path connecting the initial trajectory within the sector and the last trajectory through the shortest distance may be determined as the moving path of the second cleaner to perform follow-up. In this case, since the second cleaner moves by omitting all the trajectories between the initial trajectory and the last trajectory, it may be said that the second cleaner roughly follows the first cleaner. According to this, a time delay due to follow-up is minimized.

It may be said that the second cleaner has moved on a moving path different from the moving path corresponding to the trajectory information of the first cleaner within the sector. At this time, since the length of the other moving path is shorter than that of the moving path corresponding to the trajectory information of the first cleaner, a time delay due to follow-up is reduced.

Figure 11C:
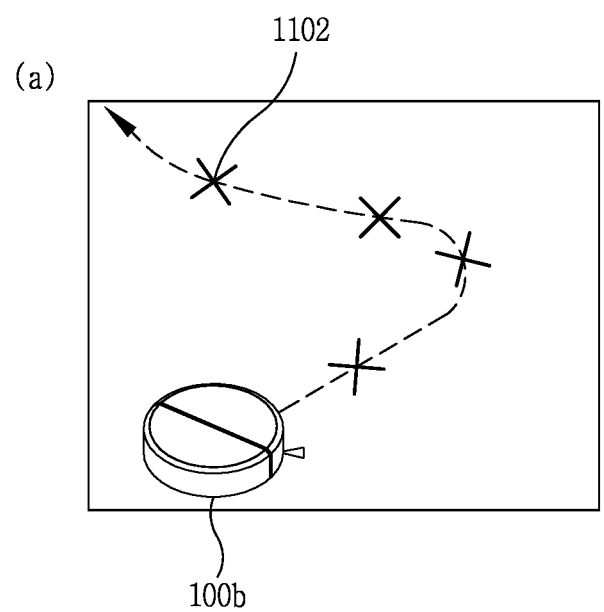
Figure 11C:
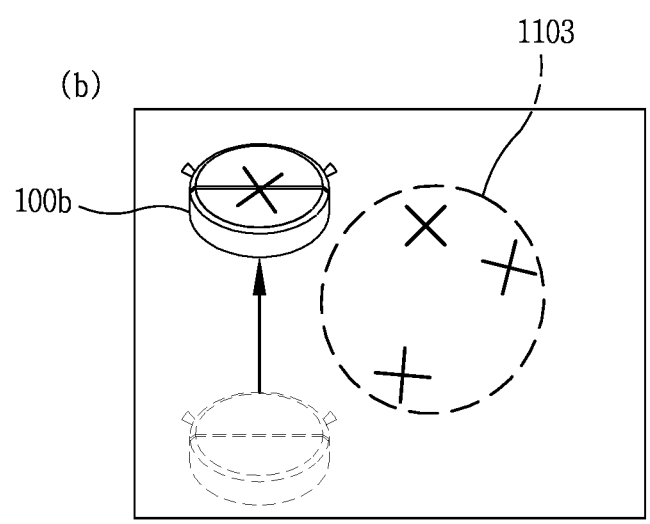

For example, (a) of FIG. 11C shows a case where the second cleaner 100*b* enters the next sector, and then selects the last point 1102 within the next sector at the current its own position as the target point to perform follow-up moving. Then, as shown in (b) of FIG. 11C, the remaining trajectories 1103 excluding the last point 1102 are removed, and the second cleaner 100*b* moves straight from the current position to the last point 1102. Therefore, the second cleaner 100*b* follows the first cleaner on a moving path shorter than the actual moving path of the first cleaner 100*a*.

On the other hand, in one example, the selection of the target point may be changed according to the moving information of the first cleaner corresponding to a trajectory within the sector.

For instance, when there are no obstacles but the number of points corresponding to the trajectory information within the sector is larger than the reference value or the interval is narrow, the second cleaner 100*b* may select the target point as an initial point or a point close thereto to allow the second cleaner 100*b* to move run in the same or similar manner to the actual trajectory of the first cleaner 100*a*.

This is because when the first cleaner 100*a* moves slowly even though there are no obstacles, it may be considered that the cleaner 100*a* has performed cleaning thoroughly due to dust or contaminants within the relevant sector, so as to allow that the second cleaner 100*b* to move in the same or similar manner to the actual trajectory of the first cleaner 100*a*.

On the contrary, when the number of points corresponding to the movement trajectory within the sector is small or the interval is very wide, it is considered that the second cleaner 100*b* is able to roughly follow the first cleaner 100*a*, and the last point or a point close thereto is selected as the target point.

As described above, the moving target point of the second cleaner may be differently selected in accordance with the moving information, for example, the moving speed, of the first cleaner even within the sector, thereby satisfying the opposite needs such as the efficiency of follow-up control and the minimization of time delay in a balance manner.

Hereinafter, an operation process in the case where trajectory information of the first cleaner is not detected within the next sector to be followed will be described in detail with reference to FIGS. 12A, 12B, 12C and 12D.

The controller of the first cleaner may control the moving of the second cleaner in a sector unit including a plurality of trajectory information, and when the follow-up disable state of the second cleaner is sensed, all the trajectory information within the current sector may be removed to determine the next sector based on the relative position and moving direction of the second cleaner.

In addition, the first cleaner may control the moving of the other cleaner in a sector unit including a plurality of trajectory information of the second cleaner so that the second cleaner follows one of the trajectory information within the determined next sector.

Furthermore, when the second cleaner moves away from the first cleaner to follow one of the trajectory information within the next sector, for example, moves away out of a predetermined critical follow-up distance, the controller of the first cleaner may change the moving speed of the first cleaner or stop the moving of the first cleaner.

Furthermore, when the moving path of the second cleaner 100*b* is determined within the sector while the second cleaner 100*b* performs a sector moving mode, the next sector to be followed is determined based on the moving direction of the second cleaner 100*b* and the next movement trajectory of the first cleaner 100*a*.

Figure 12A:
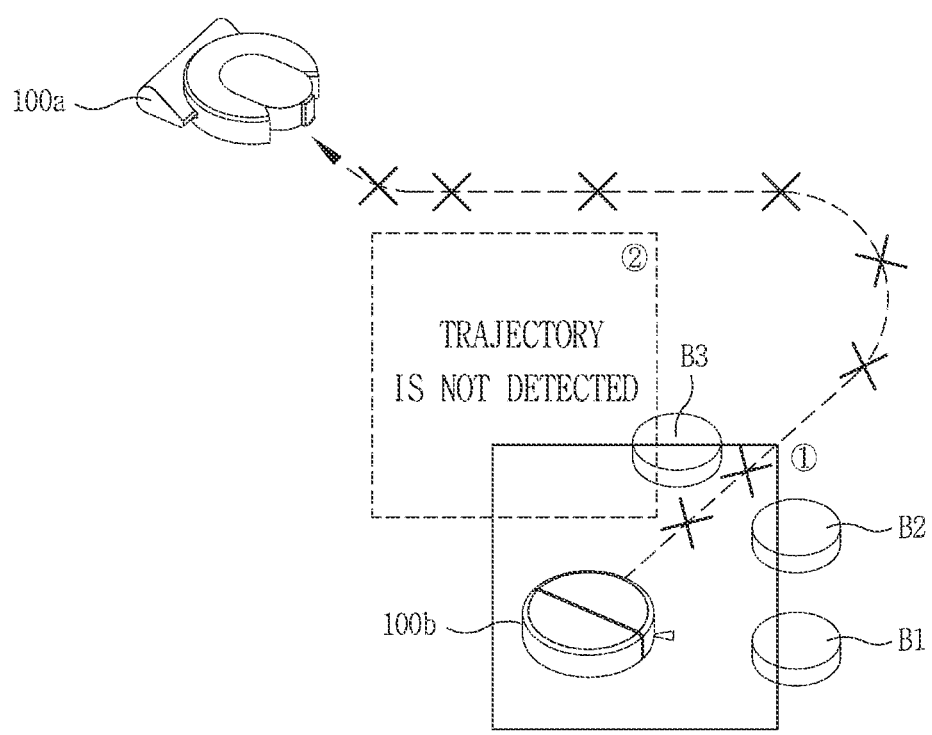
FIGS. 12A, 12B, 12C, and 12D are different exemplary conceptual views for explaining processing in the case where the setting of a sector unit and the movement trajectory of the first cleaner are not detected, according to an embodiment of the present disclosure.

At this time, as illustrated in FIG. 12A, there may be a case [1] where the movement trajectory of the first cleaner 100*a* does not enter into the next sector (2), but the first cleaner 100*a* moves out of the next sector (2). In this case, the follow-up of the second cleaner 100*b* may be interrupted.

For an example, when the trajectory of the first cleaner 100*a* is not detected within the next sector, at least one of the size and position of the sector unit may be variably applied.

Figure 12B:
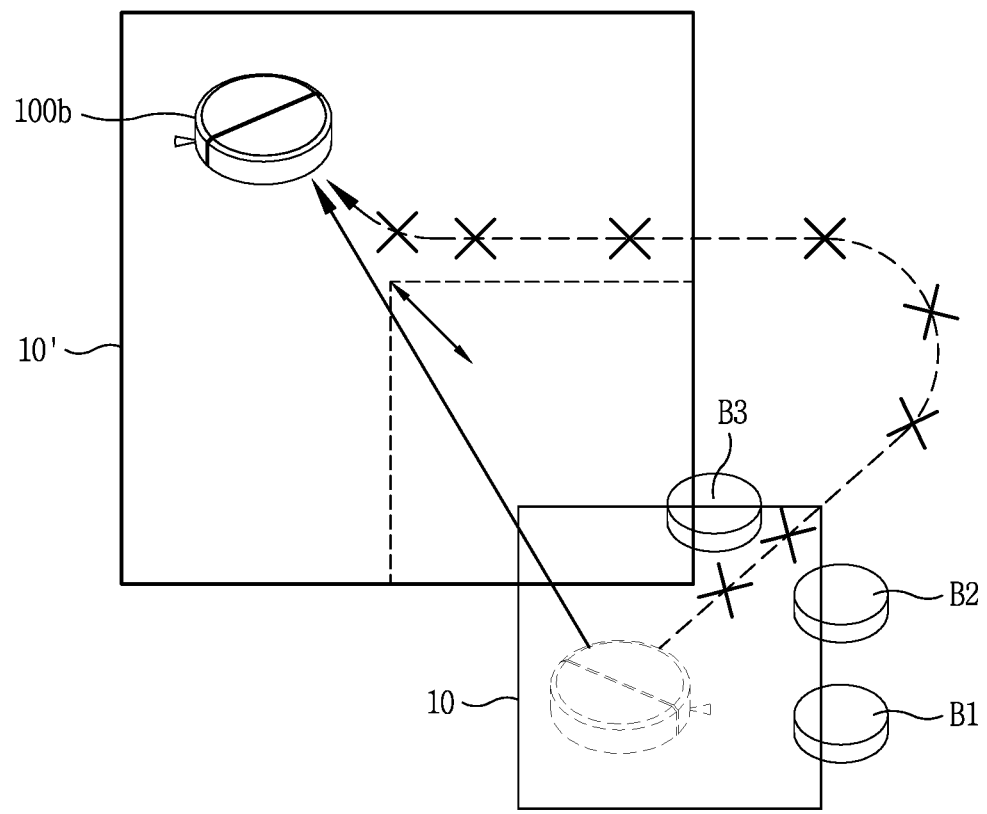

For example, as illustrated in FIG. 12B, the size of the sector is increased (10') until the next trajectory of the first cleaner 100*a* is included or until the current position of the first cleaner 100*a* (not shown). Then, the first cleaner 100*a* performs follow-up on a path from the current position of the second cleaner 100*b* to the position of the first cleaner 100*a* or the last point of the next trajectory of the first cleaner 100*a*.

On the other hand, when there is an obstacle within the varied moving path of the second cleaner 100*b*, the second cleaner 100*b* may transmit it to the first cleaner 100*a*, and thus the second cleaner 100*b* may be controlled to move the re-modified moving path.

For another example, when the trajectory of the first cleaner 100*a* is not detected within the next sector, the number of sectors may be further increased based on the next sector in which the movement trajectory of the first cleaner 100*a* is not detected, thereby detecting the next trajectory of the first cleaner 100*a*. A difference from varying the size of the sector as described above is a selection process of the moving path of the second cleaner 100*b*.

Figure 12C:
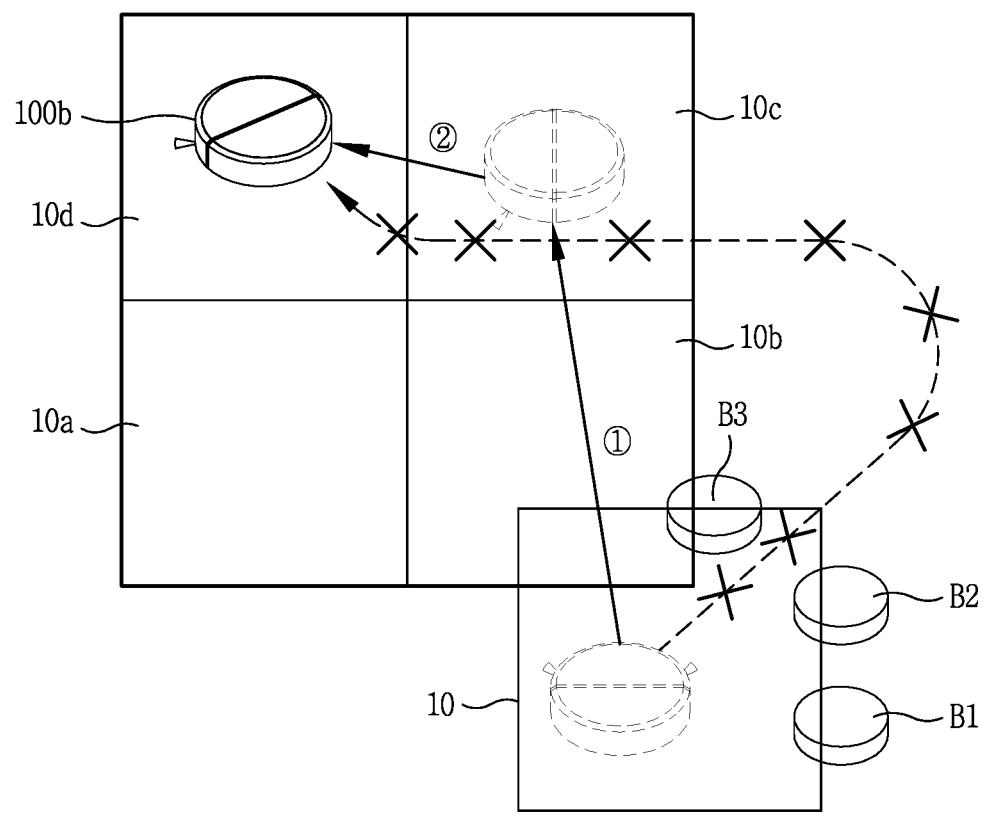

Specifically, referring to FIG. 12C, when the trajectory of the first cleaner 100*a* is not detected within the next sector 10*b*, a plurality of additional sectors 10*c*, 10*d*, 10*a* are set in a direction opposite to the previous sector 10, that is, an upward left direction, with respect to the next sector 10*b*. If the trajectory of the first cleaner 100*a* is still undetected, then the additional sectors 10*c*, 10*d*, 10*a* may be sequentially set.

The second cleaner 100*b* only determines whether or not the trajectory of the first cleaner 100*a* has been detected for each of the additional sectors 10*c*, 10*d*, 10*a*.

In FIG. 12C, when the movement trajectory of the first cleaner 100a is detected in the two additional sectors 10c, 10d, it is recognized that the additional sector 10c is first visited, and then the additional sector 10d is visited based on move information received from the first cleaner 100a.

The second cleaner 100b enters into the first additional sector 10c by the shortest distance in the current sector unit 10 and then enters into the second additional sector 10d through the shortest distance. In other words, the second cleaner 100b may move in units of additional sectors set independently of points corresponding to the movement trajectory of the first cleaner 100a.

For another example, when the trajectory of the first cleaner 100a is not detected within the next sector, if the second cleaner 100b stops driving and the first cleaner 100a enters into the next sector, then follow-up may be resumed.

Figure 12D:
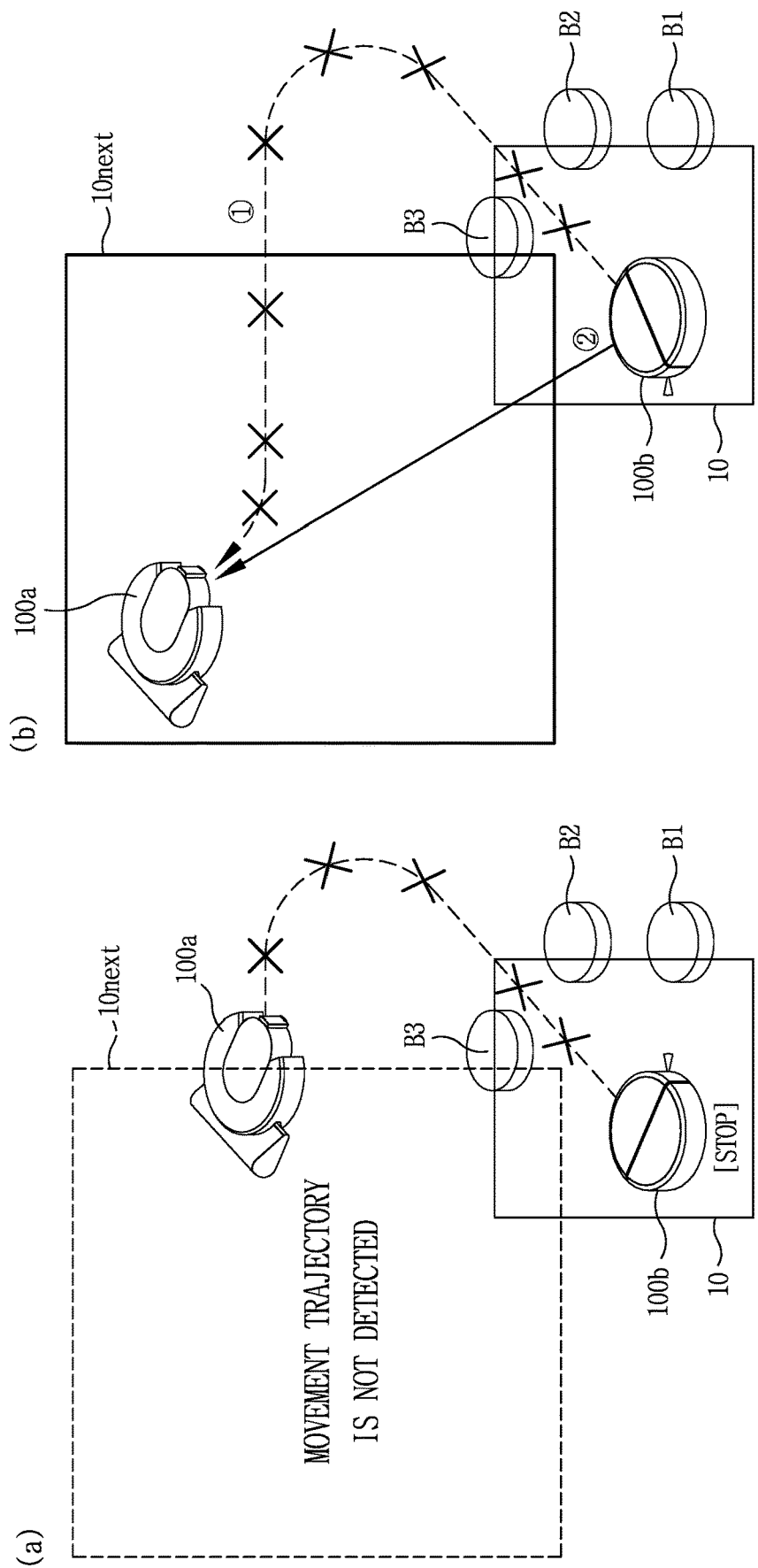

For example, as illustrated in (a) of FIG. 12D, in the current sector 10, even after the second cleaner 100b is in a follow-up disable state, and the size of the next sector unit 10 next is varied, if the trajectory of the first cleaner 100a is not detected in the sector 10 next, then the second cleaner 100b stands by in the current sector 10 in a stationary state for the time being.

Next, as illustrated in (b) of FIG. 12, when it is sensed that the first cleaner 100a enters into the next sector 10 next (1), the second cleaner 100b which has been in the stationary state moves toward the position of the first cleaner 100a. This is similar to a state in which follow-up is temporarily released and reconnected.

On the other hand, here, whether or not the first cleaner 100a has entered may be obtained based on a range of the next sector 10 next and a relative position of the first cleaner 100a.

As described above, when the trajectory of the first cleaner 100a is not detected in the sector 10 next, follow-up may be carried after waiting for the first cleaner 100a to be found without forcibly moving the second cleaner 100b, thereby preventing the waste of operation and the disconnection of follow-up.

Hereinafter, examples in which the second cleaner is allowed to enter, but performs follow-up by removing part of the trajectory of the first cleaner within the sector since the moving of the first cleaner is complicated will be described with reference to FIGS. 13A, 13B, 13C, and 13D.

In these examples, the controller of the first cleaner may transmit a signal corresponding to a moving stop command of the second cleaner when the entered region is determined to be no-entry region of the second cleaner. Then, when the first cleaner is sensed to be out of the relevant region, the moving of the second cleaner may be controlled to follow a moving path corresponding to the trajectory information of the main body stored subsequent to being out of the relevant region.

Figure 13A:
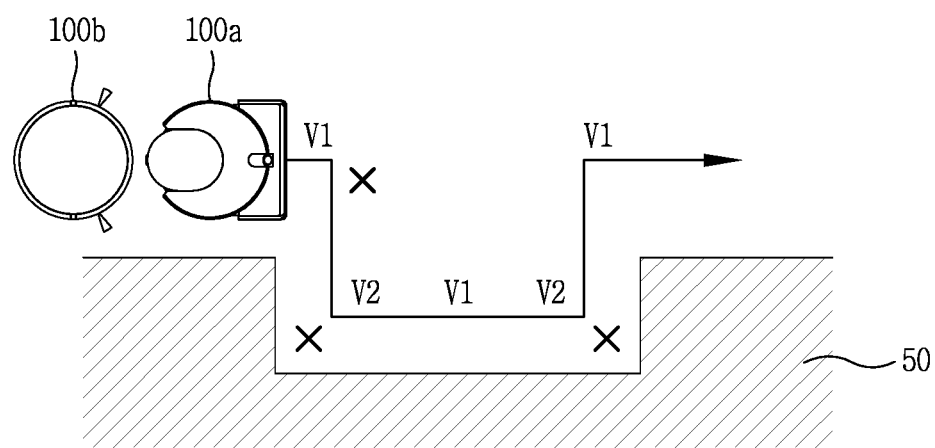
FIGS. 13A, 13B, 13C and 13D are conceptual views showing examples in which the second cleaner is allowed to enter but the moving of the first cleaner is complicated, and thus the movement trajectory of the first cleaner in the sector unit is removed to allow the second cleaner to move along the shortest distance, according to the present disclosure.

For example, referring to FIG. 13A, when the first cleaner 100a, which is the leading cleaner, performs cleaning while following an obstacle, for example, a wall 50, there may be case where the moving direction is frequently changed several times according to the shape of the wall 50.

In this case, the controller of the first cleaner 100a has to change the driving of the wheel unit 111 several times in order to change the moving direction, but the moving speed of the first cleaner 100a is also varied every time the moving direction is changed. For example, since it is required to perform in-place rotation and moving direction change at each "x" point shown in FIG. 13A, the cleaner moves at a decelerated moving speed (V2), which causes a delay in the cleaning time.

As a result, in the present disclosure, the second cleaner 100b following the first cleaner 100a may recognize that the moving direction of the first cleaner 100a is varied based on move information received from the first cleaner 100a. In this case, the movement trajectory of the first cleaner 100a is removed for a time period during which the moving direction of the first cleaner 100a is varied more than a reference number of times.

Figure 13B:
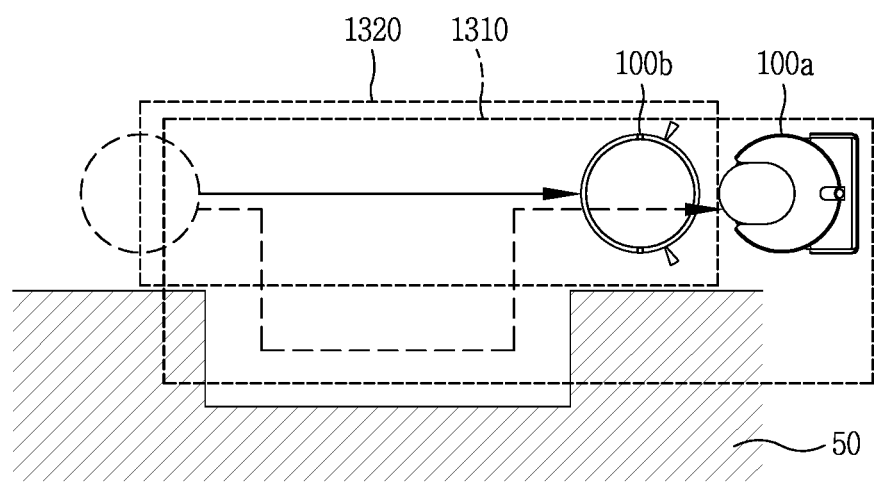

As illustrated in FIG. 13B, a region 1310 including the movement trajectory while the first cleaner 100a performs in-place rotation and a change of the moving direction several times will be regarded as the foregoing sector to remove the movement trajectory of the region. Then, the second cleaner 100b moves along a path 1320 connecting the current position of the first cleaner 100a through the shortest straight line.

Figure 13C:
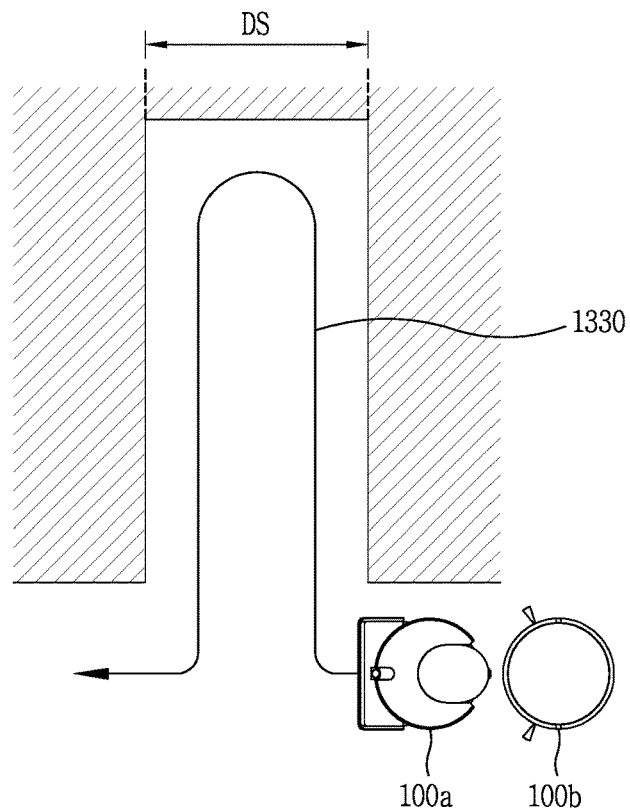
Figure 13D:
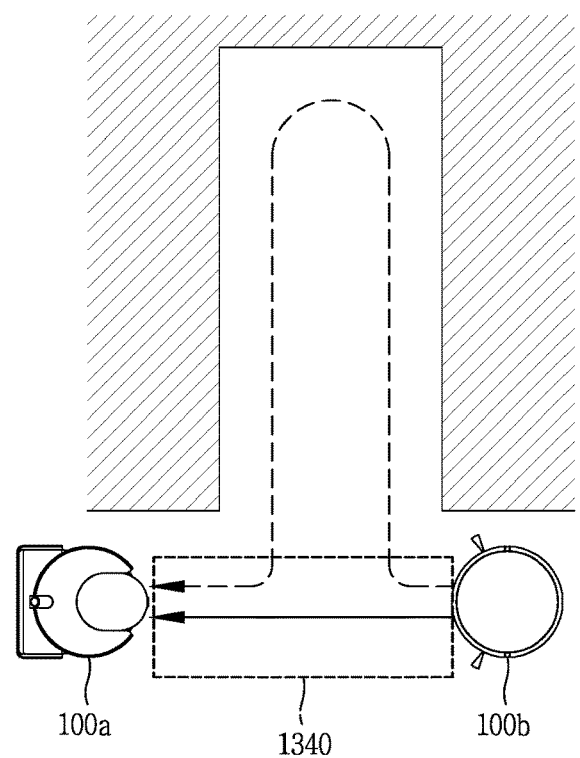

For another example, there is a case where the first cleaner 100a enters into a narrow region to leave a movement trajectory 1330 as illustrated in FIG. 13C. At this time, the width (Ds) of the narrow region is a distance that the first cleaner 100a and the second cleaner 100b is respectively able to enter, but have difficulty in avoidance without any backward movement.

When the second cleaner 100b enters while following the first cleaner 100a, the maximum interval that is unavoidable without any backward movement may be defined as a "reference value of the width".

When the width of a moving region in which the first cleaner 100a has entered is less than the reference value, the controller of the second cleaner 100b may control to remove a trajectory 1330 in the relevant moving region of the first cleaner 100a, and move along a path 1340 connecting the position of the first cleaner through the shortest straight line at a time point when the first cleaner exits the relevant moving region.

As described above, when the leading cleaner changes its moving direction several times in a short period of time, or when the leading cleaner enters into a narrow region, all movement trajectories in a predetermined period of time or in a narrow region may be removed, thereby minimizing time delay.

Next, a method of moving the first cleaner for maintaining the follow-up relationship when the second cleaner is unable to enter at all into the sector unit will be described in detail with reference to FIGS. 14A, 14B and 14C.

Figure 14A:
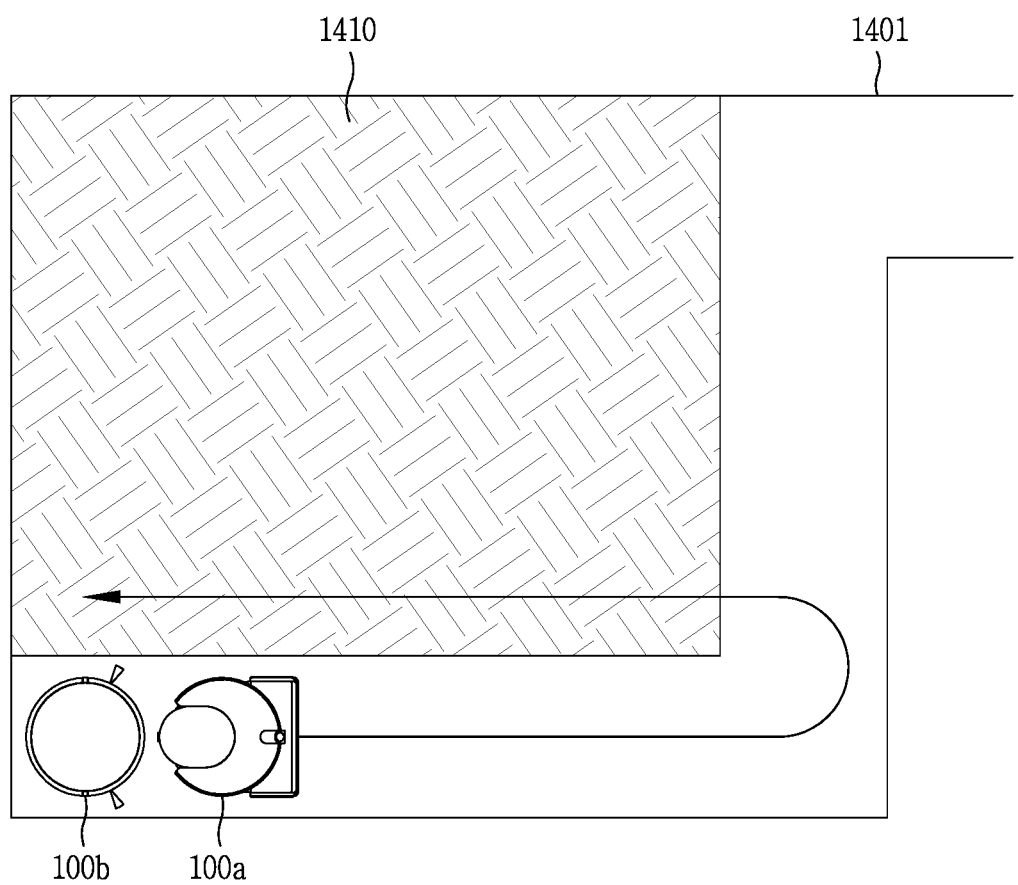
FIGS. 14A, 14B and 14C are conceptual views for explaining a moving method of the first cleaner when the second cleaner is unable to enter the sector unit, according to an embodiment of the present disclosure.
Figure 14B:
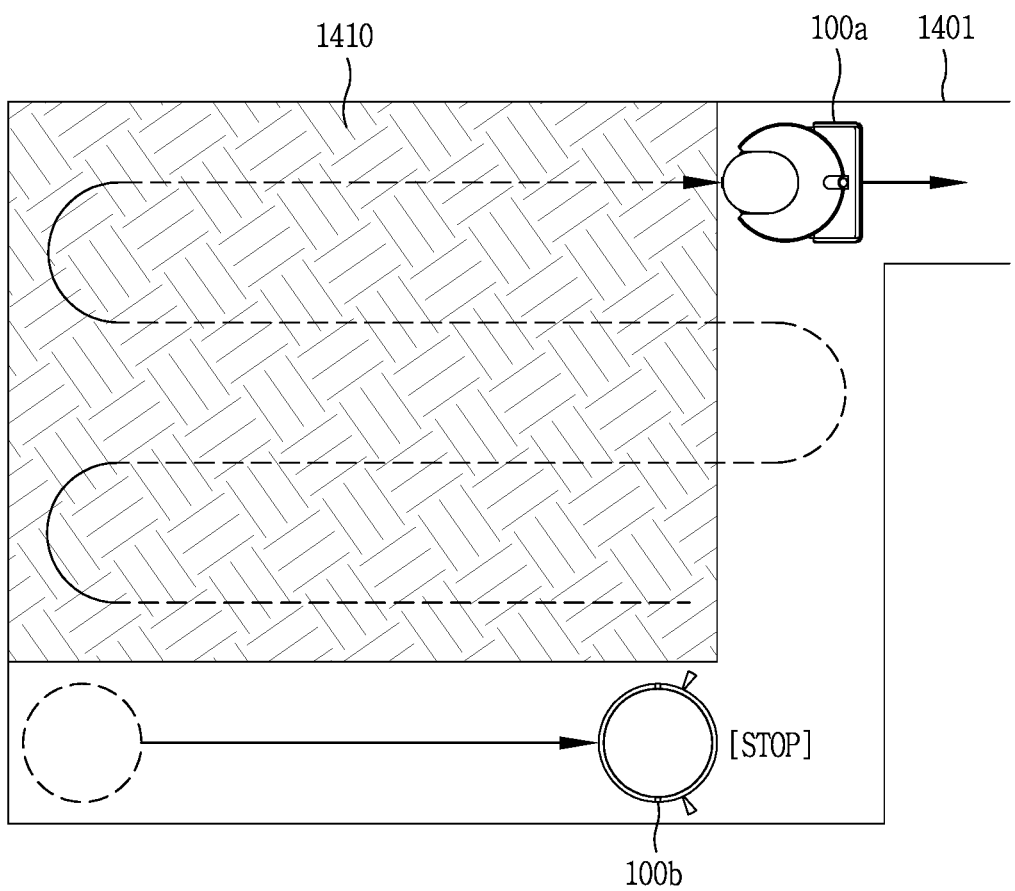
Figure 14C:
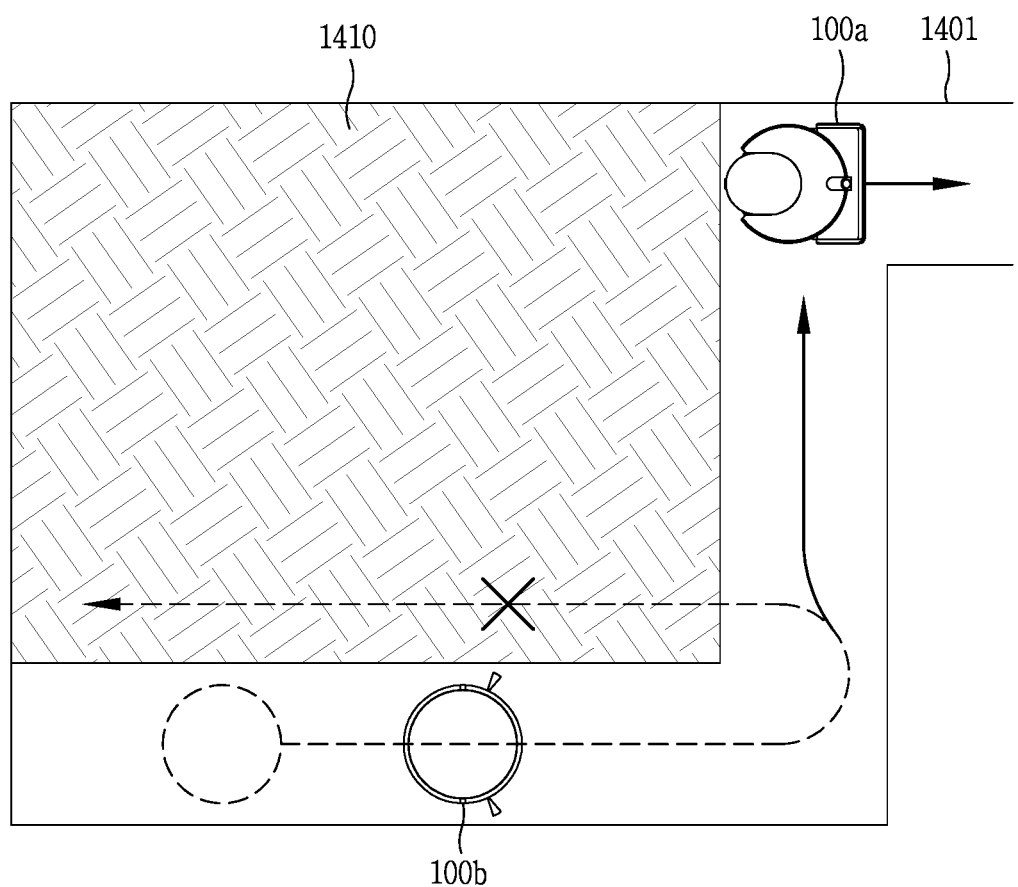

In other words, FIGS. 14A, 14B, and 14C show a case where the first cleaner 100a has no difficulty in entering and moving, but the second cleaner 100b is unable to enter at all, and it may occur when the first cleaner 100a and the second cleaner 100b are different types from each other.

At this time, it may not be possible to determine the possibility of entry of the second cleaner 100b by only obstacle information received from the first cleaner 100a. Therefore, at this time, it is necessary to transmit the state information of the following cleaner to the leading cleaner.

First, referring to FIG. 14A, when performing follow-up between different types of cleaners, a sector unit 1410 in which the first cleaner 100a is able to enter but the second cleaner 100b is unable to enter may occur within a designated cleaning area 1401. The example may include a sill, a carpet, under a low-height furniture, or the like.

In this case, the second cleaner 100b informs the first cleaner 100a that it is unable to enter the relevant sector unit 1410 through the communication unit. At the same time or sequentially, the second cleaner 100b stops the operation of the traveling unit 1300.

Next, the controller of the second cleaner 100b controls to follow the trajectory of the first cleaner 100a at a time point when the first cleaner 100a is sensed to be out of the relevant sector based on move information received from the first cleaner 100a.

In this situation, the first cleaner 100a may be controlled in one of the following two scenarios.

For example, as illustrated in FIG. 14B, there is a scheme of performing cleaning alone while moving the sector unit 1410 that disallows the second cleaner 100b to enter, and then informing the second cleaner 100b at a time point when the first cleaner 100a exits the sector 1410 to resume follow-up.

For another example, as illustrated in FIG. 14C, when information indicating that the second cleaner 100b is unable to enter the sector unit 1410 is received from the second cleaner 100b, the first cleaner 100a does not enter the sector unit 1410 or immediately exits the sector unit 1410. Then, follow-up control is carried out while maintaining the following distance with respect to the second cleaner 100b.

At this time, the uncleaned sector unit 1410 may be controlled to allow the first cleaner 100a to perform cleaning alone after the cleaning of the designated cleaning area 1401 is all completed.

Figure 15A:
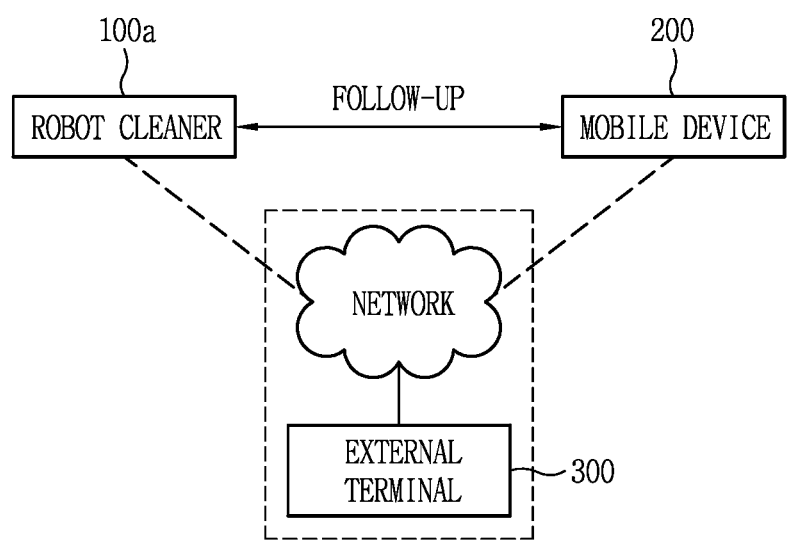
FIGS. 15A, 15B and 15C are conceptual views illustrating follow-up registration and follow-up control between a mobile robot and other mobile devices, according to a modified embodiment of the present disclosure.
Figure 15B:
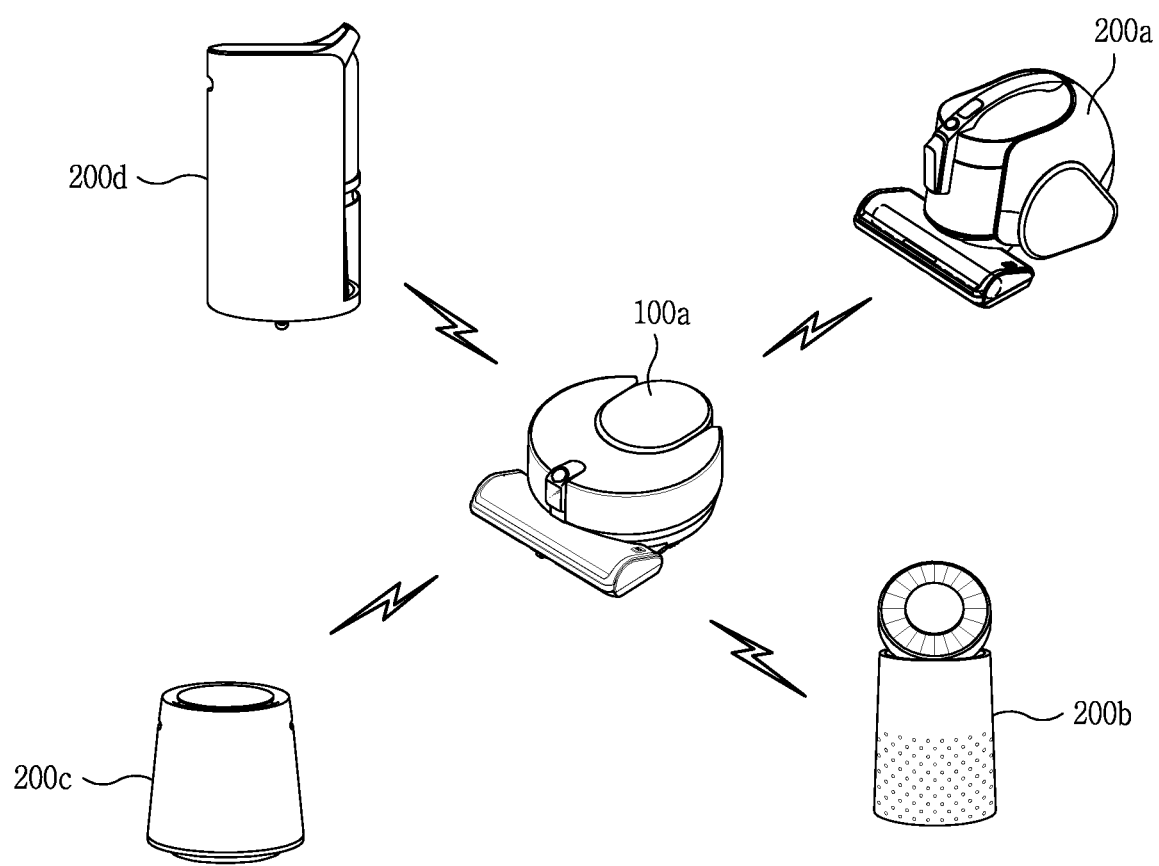
Figure 15C:
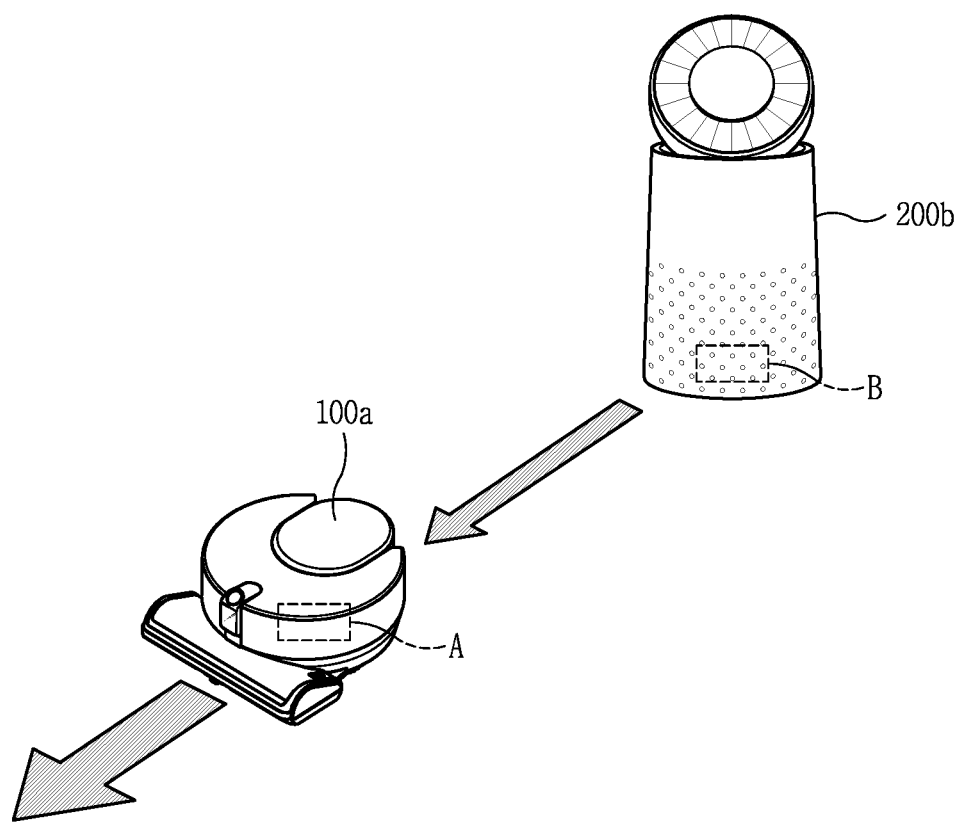

FIGS. 15A, 15B, and 15C are modified examples of follow-up control between the first cleaner and the second cleaner in accordance with the foregoing embodiments of the present disclosure, and here, follow-up control between the first cleaner and a mobile device will be described in detail. Here, the follow-up control disclosed herein means only that the mobile device follows a movement path of the first cleaner.

Referring to FIG. 15A, the first cleaner 100a may control the follow-up of a mobile device 200 by communicating with the mobile device 200 instead of the second cleaner.

Here, the mobile device 200 may not have a cleaning function, and may be any electronic device if it is provided with a driving function. For example, the mobile device 200 may include various types of home appliances or other electronic devices, such as a dehumidifier, a humidifier, an air purifier, an air conditioner, a smart TV, an artificial intelligent speaker, a digital photographing device, and the like, with no limit.

In addition, the mobile device 200 may be any device if it is equipped with a moving function, and may not have a navigation function for detecting an obstacle by itself or moving up to a predetermined destination.

The first cleaner 100a is a robot cleaner having both the navigation function and the obstacle detection function and can control the follow-up of the mobile device 200. The first cleaner 100a may be a dry cleaner or a wet cleaner.

The first cleaner 100a and the mobile device 200 can communicate with each other through a network (not shown), but may directly communicate with each other.

Here, the communication using the network is may be communication using, for example, WLAN, WPAN, Wi-Fi, Wi-Fi Direct™, Digital Living Network Alliance (DLNA), Wireless Broadband (WiBro), World Interoperability for Microwave Access (WiMAX™), etc. The mutual direct communication may be performed using, for example, UWB, Zigbee™, Z-wave™ Blue-Tooth™, RFID, and Infrared Data Association (IrDA), and the like.

If the first cleaner 100a and the mobile device 200 are close to each other, the mobile device 200 may be set to follow the first cleaner 100a through a manipulation in the first cleaner 100a.

If the first cleaner 100a and the mobile device 200 are far away from each other, although not shown, the mobile device 200 may be set to follow the first cleaner 100a through a manipulation in an external terminal 300 (see FIG. 15A).

Specifically, follow-up relationship between the first cleaner 100a and the mobile device 200 may be established through network communication with the external terminal 300. Here, the external terminal 300 is an electronic device capable of performing wired or wireless communication, and may be a tablet, a smart phone, a notebook computer, or the like. At least one application related to follow-up control by the first cleaner 100a (hereinafter, "follow-up related application") may be installed in the external terminal 300. The user may execute the follow-up related application installed in the external terminal 300 to select and register the mobile device 200 subjected to the follow-up control by the first cleaner 100a. When the mobile device 200 subjected to the follow-up control is registered, the external terminal may recognize product information of the mobile device, and such product information may be provided to the first cleaner 100a via the network.

The external terminal 300 may recognize the position of the first cleaner 100a and the position of the registered mobile device 200 through communication with the first cleaner 100a and the registered mobile device 200. Afterwards, the first cleaner 100a may move toward the position of the registered mobile device 200 or the registered mobile device 200 may move toward the position of the first cleaner 100a according to a control signal transmitted from the external terminal 300. When it is detected that the relative positions of the first cleaner 100a and the registered mobile device 200 are within a predetermined following distance, the follow-up control for the mobile device 200 by the first cleaner 100a is started. After then, the follow-up control is performed by direct communication between the first cleaner 100a and the mobile device 200 without the intervention of the external terminal 300.

The setting of the follow-up control may be released by the operation of the external terminal 300 or automatically terminated as the first cleaner 100a and the mobile device 200 move away from the predetermined following distance.

The user can change, add or remove the mobile device 200 to be controlled by the first cleaner 100a by manipulating the first cleaner 100a or the external terminal 300. For example, referring to FIG. 15B, the first cleaner 100a may perform the follow-up control for at least one mobile device 200 of another cleaner 200a or 100b, an air purifier 200b, a humidifier 200c, and a dehumidifier 200d.

In general, since the mobile device 200 is different from the first cleaner 100a in its function, product size, and moving ability, it is difficult for the mobile device 200 to follow the movement path of the mobile terminal 100a as it is.

For example, there may be an exceptional situation in which it is difficult for the mobile device 200 to follow the movement path of the first cleaner 100a according to a moving mode, a geographic feature of a space, a size of an obstacle, and the like. In consideration of such an exceptional situation, the mobile device 200 may move or wait by omitting a part of the movement path even if it recognizes the movement path of the first cleaner 100a.

To this end, the first cleaner 100a may detect whether or not the exceptional situation occurs, and control the mobile device 200 to store data corresponding to the movement path of the first cleaner 100a in a memory or the like. Then, depending on situations, the first cleaner 100a may control the mobile device 200 to move with deleting part of the stored data or to wait in a stopped state.

FIG. 15C illustrates an example of a follow-up control between the first cleaner 100a and the mobile device 200, for example, the air cleaner 200b having a moving function. The first cleaner 100a and the air purifier 200b may include communication modules A and B for determining relative positions thereof, respectively. The communication modules A and B may be one of modules for emitting and receiving an IR signal, an ultrasonic signal, a carrier frequency, or an impulse signal. The recognition of the relative positions through the communication modules A and B has been described above in detail, so a description thereof will be omitted.

The air purifier 200b may receive moving information corresponding to a moving command (e.g., changes in moving including a moving direction and a moving speed, moving stop, etc.) from the first cleaner 100a, move according to the received moving information, and perform air purification.

Accordingly, the air purification may be performed in real time with respect to a cleaning space in which the first cleaner 100a operates. In addition, since the first cleaner 100a has already recognized the production information related to the mobile device 200, the first cleaner 100a can control the air purifier 200b to record the moving information of the first cleaner 100a, and move with deleting part of the moving information or wait in a stopped state.

As described above, according to a plurality of robot cleaners in accordance with an embodiment of the present disclosure, the second cleaner may be controlled to normally perform cleaning while sequentially following the movement trajectory of the first cleaner, and roughly follow the first cleaner in a predetermined sized sector unit when a movement trajectory is detected within a complex region or a complex sector or the movement trajectory forms a complex path, thereby solving a time delay problem caused in a complicated situation while maintaining cleaning efficiency according to follow-up. Furthermore, even though it is not a case of processing a complex region or sector, when the first cleaner as the leading cleaner changes its moving direction several times in a short period of time, or when the leading cleaner enters into a narrow region, all movement trajectories in a predetermined period of time or in a narrow region may be removed, thereby minimizing time delay due to follow-up. Moreover, even when the second cleaner follows the first cleaner in a sector unit, the target point within the sector may be selected differently according to the moving information of the first cleaner, thereby satisfying the opposite needs such as the efficiency of follow-up control and the minimization of time delay in a balance manner.

The present disclosure described above may be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800. The above detailed description should not be limitedly construed in all aspects and should be considered as illustrative. The scope of the present invention should be determined by rational interpretation of the appended claims, and all changes within the scope of equivalents of the present invention are included in the scope of the present disclosure.

What is the claimed is:

1. A mobile robot, comprising:
a traveling unit including a motor configured to move a main body by operating the motor to rotate wheels of the main body;
a memory configured to store trajectory information of a moving path corresponding to the movement of the main body;
a communication unit configured to communicate with another mobile robot that emits a signal; and
a controller configured to recognize a location of the another mobile robot based on the signal, and control the another mobile robot to follow a moving path corresponding to the stored trajectory information based on the recognized location, and
wherein the controller is configured to control the moving of the another mobile robot to remove at least part of the stored trajectory information, and allow the another mobile robot to follow a moving path corresponding to a sector unit comprising a plurality of remaining trajectory information in response to whether the moving path corresponding to next trajectory information to be followed by the another mobile robot satisfies a specified condition,
wherein the controller is configured to remove all trajectory information in a current sector in response to the satisfaction of the specified condition, determine a next sector based on the current location and moving direction of the another mobile robot, and output a control command to change or stop a moving speed of the main body when the another mobile robot moves away from the main body to follow one of the trajectory information in the determined next sector.

2. The mobile robot of claim 1, wherein whether or not the moving path corresponding to next trajectory information to be followed by the another mobile robot satisfies a specified condition is determined based on at least one of information on an obstacle sensed through a sensor of the main body, identification information of the another mobile robot, information related to an operating state of the another mobile robot, and floor state information on which the another mobile robot is located.

3. The mobile robot of claim 1, wherein trajectory information followed by the another mobile robot in the trajectory information stored in the memory is deleted from the memory.

4. The mobile robot of claim 1, wherein when a moving path corresponding to first trajectory information to be followed at a current location of the another mobile robot satisfies a specified condition, the controller transmits a control command for moving the another mobile robot to a location corresponding to second trajectory information stored subsequent to the first trajectory information.

5. The mobile robot of claim 4, wherein at least one intermediate trajectory information is included between the first trajectory information and the second trajectory information, and
wherein the controller is configured to delete the first trajectory information and the one or more intermediate trajectory information from the memory in response to the movement of the another mobile robot to a location corresponding to the second trajectory information.

6. The mobile robot of claim 1, wherein the mobile robot further comprises an obstacle sensor configured to sense a plurality of obstacles, and wherein when it is sensed that a plurality of obstacles have approached a location of next trajectory information to be followed at a current location of the another mobile robot, the controller is configured to control the moving of the another mobile robot to follow the main body on another moving path instead of the moving path including the next trajectory information.

7. The mobile robot of claim 1, wherein the controller is configured to control moving to allow the another mobile robot to follow a moving path corresponding to the stored trajectory information in a sector unit, and
a single sector comprises a moving path corresponding to a plurality of trajectory information.

8. The mobile robot of claim 1, wherein the controller is configured to control the another mobile robot to move on a moving path different from a moving path of the main body corresponding to a plurality of trajectory information in response to the satisfaction of the specified condition, and
the different moving path has a shorter path length than the moving path of the main body.

9. The mobile robot of claim 1, wherein the controller is configured to change at least one of a size and a location of the next sector to detect the next trajectory information of the main body in response to a non-detection of the next trajectory information of the main body in the next sector.

10. The mobile robot of claim 1, wherein the controller is configured to increase the number of sectors to detect the next trajectory information of the main body in response to a non-detection of the next trajectory information of the main body in the next sector.

11. The mobile robot of claim 1, wherein the controller is configured to stop the moving of the another mobile robot until the main body enters into the next sector in response to a non-detection of the next trajectory information of the main body in the next sector.

12. The mobile robot of claim 1, wherein the controller is configured to control the moving of the another mobile robot to move on a path connected by a shortest straight line from a current location of the another mobile robot to a current location of the main body, instead of a moving path corresponding to the trajectory information of the main body detected for a predetermined period of time, in response to a change in the moving direction of the main body more than a reference number of times for the predetermined period of time.

13. The mobile robot of claim 1, wherein the controller is configured to control the moving of the another mobile robot to remove the trajectory information of the main body in a moving region in which the main body has entered, and follow trajectory information after the main body moves out of the relevant moving region in response to whether a width of the entered moving region is less than a reference range.

14. The mobile robot of claim 1, wherein the controller is configured to transmit a signal corresponding to a moving stop command to the another mobile robot when it is determined that a region in which the main body enters is a non-entry region of the another mobile robot, and controls the moving of the another mobile robot to follow a moving path corresponding to the trajectory information of the main body stored subsequent to moving out of the relevant region when the main body moves out of the relevant region.

15. A plurality of mobile robots comprising a first mobile robot and a second mobile robot, wherein the first mobile robot is configured to communicate with the second mobile robot that emits a signal to recognize a location of the second mobile robot, store the trajectory information of a moving path corresponding to the movement of the first mobile robot, and control the second mobile robot to follow a moving path corresponding to the stored trajectory information based on the recognized location of the second mobile robot, and
the first mobile robot is configured to remove at least part of the stored trajectory information, and controls the second mobile robot to follow a moving path corresponding to a sector unit comprising a plurality of remaining trajectory information in response to whether the moving path corresponding to next trajectory information to be followed at a current location of the second mobile robot satisfies a specified condition,
wherein the first mobile robot is further configured to remove all trajectory information in a current sector in response to the satisfaction of the specified condition, determine a next sector based on the current location and moving direction of the another mobile robot, and output a control command to change or stop a moving speed of the main body when the second mobile robot moves away from a main body of the first mobile robot to follow one of the trajectory information in the determined next sector.

16. A method of controlling a mobile robot, the method comprising:
storing trajectory information of a moving path corresponding to movement of a mobile robot main body;
communicating with another mobile robot that emits a signal to recognize a location of the another mobile robot;
controlling moving of the another mobile robot such that the another mobile robot follows a moving path corresponding to the stored trajectory information based on the recognized location;
sensing that a moving path corresponding to next trajectory information to be followed by the another mobile robot satisfies a specified condition; and
controlling the moving of the another mobile robot to remove part of the stored trajectory information such that the another mobile robot follows a moving path corresponding to a sector unit comprising a plurality of remaining trajectory information according to the sensing,
wherein the method is further comprising removing all trajectory information in a current sector in response to the satisfaction of the specified condition, determining a next sector based on the current location and moving direction of the another mobile robot, and outputting a control command to change or stop a moving speed of the main body when the another mobile robot moves away from the main body to follow one of the trajectory information in the determined next sector.

17. The method of claim 16, wherein whether or not the specified condition is satisfied is determined by at least one of information on an obstacle sensed through a sensor of the main body, identification information of the another mobile robot, information related to an operating state of the another mobile robot, and floor state information at a current location of the another mobile robot.

18. A mobile robot, comprising:
a traveling unit including a motor configured to move a main body by operating the motor to rotate wheels of the main body;
a memory configured to store trajectory information of a moving path corresponding to the movement of the main body;
a communication unit configured to communicate with another mobile robot that emits a signal; and a controller configured to recognize a location of the another mobile robot based on the signal, and control the another mobile robot to follow a moving path corresponding to the stored trajectory information based on the recognized location, and
wherein the controller is configured to control the moving of the another mobile robot to remove the trajectory information of the main body in a moving region in which the main body has entered, and follow trajectory information after the main body moves out of the relevant moving region in response to whether a width of the entered moving region is less than a reference range.

* * * * *